(12) United States Patent
Yoshizawa et al.

(10) Patent No.: US 8,830,801 B2
(45) Date of Patent: Sep. 9, 2014

(54) NEAR-FIELD LIGHT DEVICE, RECORDING APPARATUS USING THE SAME, AND RECORDING METHOD

(75) Inventors: Katsumi Yoshizawa, Koshu (JP); Satoshi Sugiura, Tokyo (JP); Takayuki Kasuya, Ota (JP)

(73) Assignees: Pioneer Corporation, Kanagawa (JP); Pioneer Micro Technology Corporation, Yamanashi (JP)

( * ) Notice: Subject to any disclaimer, the term of this patent is extended or adjusted under 35 U.S.C. 154(b) by 0 days.

(21) Appl. No.: 13/984,442

(22) PCT Filed: Feb. 17, 2012

(86) PCT No.: PCT/JP2012/053849
§ 371 (c)(1),
(2), (4) Date: Oct. 23, 2013

(87) PCT Pub. No.: WO2012/111816
PCT Pub. Date: Aug. 23, 2012

(65) Prior Publication Data
US 2014/0036647 A1    Feb. 6, 2014

(30) Foreign Application Priority Data

Feb. 18, 2011  (WO) .................. PCT/JP2011/053537
Jul. 15, 2011   (WO) .................. PCT/JP2011/066269

(51) Int. Cl.
*G11B 11/00*          (2006.01)
(52) U.S. Cl.
USPC ....................................................... 369/13.33
(58) Field of Classification Search
None
See application file for complete search history.

(56) References Cited

U.S. PATENT DOCUMENTS

| 8,054,570 B2 | 11/2011 | Hirata et al. | |
|---|---|---|---|
| 2010/0021104 A1* | 1/2010 | Yamagiwa et al. | 385/8 |
| 2010/0128577 A1* | 5/2010 | Kotani | 369/13.24 |
| 2010/0157745 A1 | 6/2010 | Okdada et al. | |
| 2010/0157746 A1 | 6/2010 | Hongo | |

FOREIGN PATENT DOCUMENTS

| JP | 2003-045004 | 2/2003 |
|---|---|---|
| JP | 2006-080459 | 3/2006 |
| JP | 2008-217961 | 9/2008 |
| JP | 2009-163834 | 7/2009 |
| JP | 2009-231601 | 10/2009 |
| JP | 2010-146655 | 7/2010 |
| JP | 2010-146656 | 7/2010 |
| JP | 2010-146663 | 7/2010 |

OTHER PUBLICATIONS

International Search Report, PCT/JP2012/053849, May 22, 2012.

* cited by examiner

*Primary Examiner* — Paul Huber
(74) *Attorney, Agent, or Firm* — Young & Thompson

(57) ABSTRACT

A recording apparatus records information onto a recording medium. The recording apparatus is provided with: a near-field light device; and a control unit for controlling the near-field light device. The near-field light device is provided with: a light source; a quantum dot structure which is laminated on the light source; a plurality of quantity dots which are included in the quantity dot structure and each of which generates near-field light on the basis of light emitted from the light source; and an output end which is configured to output at least one portion of energy of the near-field light to the exterior of the quantity dot structure. The control unit of the recording apparatus controls the light source to emit the light upon recording the information, thereby increasing temperature of a region of the recording medium based on a size of the output end.

19 Claims, 22 Drawing Sheets

FIG. 9
(a)
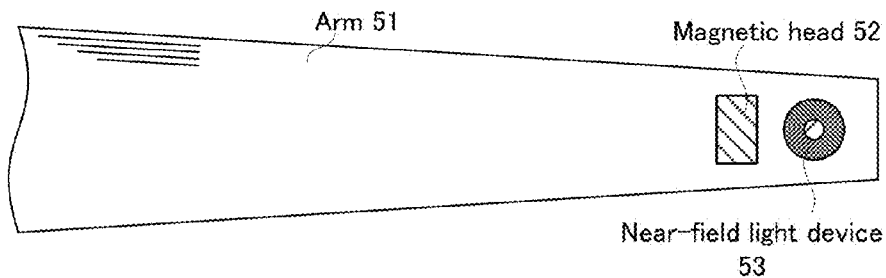
(b)
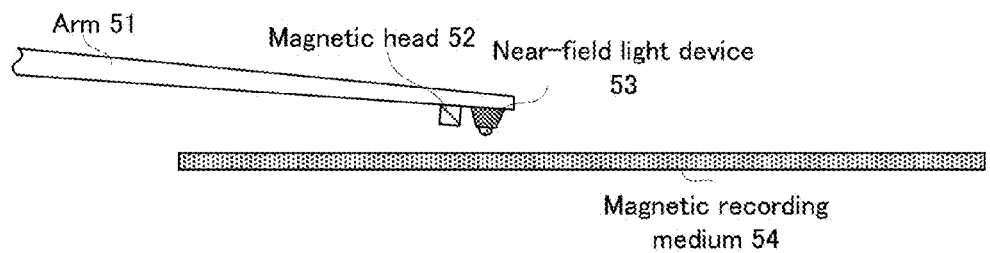

(a)

(b)

(c)

(d)

(a)

(b)

NEAR-FIELD LIGHT DEVICE, RECORDING APPARATUS USING THE SAME, AND RECORDING METHOD

This application is a 371 of PCT/JP2012/053849, filed Feb. 17, 2012.

TECHNICAL FIELD

The present invention relates to, for example, a recording apparatus and a recording method which are configured to use of a nano-spot by near-field light.

BACKGROUND ART

As an example of the use of a nanoscale light spot smaller than an optical diffraction limit, thermally assisted magnetic recording, which uses the near-field light as a light source for increasing temperature of a magnetic recording medium (refer to Patent documents 1 to 4), is suggested.

Moreover, thanks to recent advances in semiconductor microfabrication technology, nanoscale quantum dots have drawn attention in the communication network field, wherein the nanoscale quantum dots use ultimate particle property by controlling a single electron with quantum mechanical effects. For example, following technologies are suggested, a manufacturing method for appropriately controlling the size of quantum dots (refer to Patent document 5), and a near-field concentrator using multi-layered quantum dots (refer to Patent document 6).

PRIOR ART DOCUMENT

Patent Document

Patent document 1: Japanese Patent Application Laid Open No. 2009-163834
Patent document 2: Japanese Patent Application Laid Open No. 2010-146655
Patent document 3: Japanese Patent Application Laid Open No. 2010-146663
Patent document 4: Japanese Patent Application Laid Open No. 2003-045004
Patent document 5: Japanese Patent Application Laid Open No. 2009-231601
Patent document 6: Japanese Patent Application Laid Open No. 2006-080459

DISCLOSURE OF INVENTION

Subject to be Solved by the Invention

In a configuration of the thermally assisted magnetic recording described in the Patent documents 1 to 4, laser light is concentrated by using an objective lens and an optical waveguide; however, this method does not enable the laser light to be narrowed down to a size which is less than or equal to a wavelength of the laser light. A metal conductor which is a near-field light generating unit, however, is several tens nanometers or less in size, which is less than or equal to the wavelength of the laser light. Thus, most of the concentrated laser light does not contribute to the generation of the near-field light, which is less efficient.

Moreover, since energy is concentrated on a micro region, there is a possibility that the metal conductor itself melts, then there is also a problem that continuous drive is difficult.

In view of the aforementioned problems, it is therefore an object of the present invention to provide a near-field light device which is configured to generate micro-size near-field light by applying the near-field light device using the quantum dots in the communication network field, to the magnetic recording, a recording apparatus using the same, and a recording method.

Means for Solving the Subject

The near-field light device of the present invention, in order to solve the above-mentioned subject, is provided with: a light source; a quantum dot structure which is laminated on the light source; a plurality of first quantity dots which are disposed on a first surface in the quantity dot structure and each of which generates near-field light on the basis of light emitted from the light source; and an output end which is configured to output at least one portion of energy of the near-field light to the exterior of the quantity dot structure. The output end is smaller in size than wavelength of the light source.

The recording apparatus of the present invention is, in order to solve the above-mentioned subject, a recording apparatus for recording information onto a recording medium. The recording apparatus is provided with: a near-field light device; and a control unit for controlling the near-field light device. The near-field light device is provided with: a light source; a quantum dot structure which is laminated on the light source; a plurality of quantity dots which are included in the quantity dot structure and each of which generates near-field light on the basis of light emitted from the light source; and an output end which is configured to output at least one portion of energy of the near-field light to the exterior of the quantity dot structure. The control unit controls the light source to emit the light upon recording the information, thereby increasing temperature of a region of the recording medium based on a size of the output end.

The recording method of the present invention is, in order to solve the above-mentioned subject, a recording method of recording information onto a recording medium in a recording apparatus comprising a near-field light device, which has: a light source; quantum dots which generate near-field light by receiving light emitted from the light source; and an output end which is configured to output at least one portion of energy of the near-field light to the exterior. The recording method is provided with: a step of emitting the light from the light source; a step of generating the near-field light in the quantity dots due to the emitted light and outputting the at least one portion of the energy of the near-field light to the exterior; and a step of increasing temperature of a region of the recording medium based on a size of the output end.

The operation and other advantages of the present invention will become more apparent from embodiments explained below.

BRIEF DESCRIPTION OF DRAWINGS

FIG. 9 are diagrams illustrating an example in which the near-field light device of the present invention is applied to the magnetic recording.

MODES FOR CARRYING OUT THE INVENTION

Figure 1:
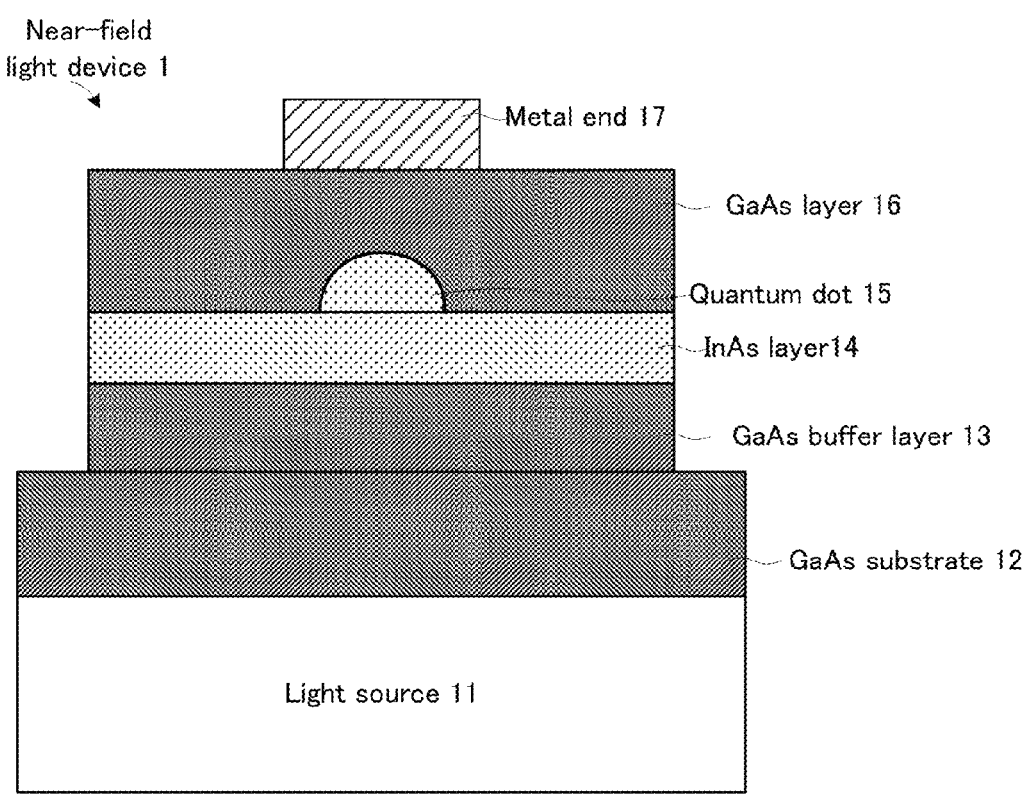
FIG. 1 is a diagram illustrating a structure of a near-field light device in a first embodiment of the present invention.

Hereinafter, embodiments of the present invention will be explained in detail with reference to the drawings. In each of the drawings referred to below, each layer and each member have different scales so that each layer and each member have sizes large enough to be recognized on the drawing.

<First Embodiment>

Firstly, a near-field light device 1 using a quantum dot to which the present invention is applied will be explained. The near-field light device 1 is provided, as illustrated in FIG. 1, with a light source 11, a GaAs substrate 12, a GaAs buffer layer 13, an InAs layer 14, an InAs quantum dot 15, a GaAs layer 16, and a metal end 17.

The light source 11 and the GaAs layer 12 are joined in FIG. 1, but may be separated. The light source 11 may be a light emitting diode (LED), or may be a semiconductor laser. The GaAs substrate 12 is designed to have a thickness which allows transmission of incident light from the light source 11. The metal end 17 is preferably, but not limited to, metal having an energy band in which energy of near-field light can be efficiently absorbed (e.g. gold (Au)), and may be metal other than gold (Au). The metal end 17 may be various semiconductors. A quantum dot structure illustrated in FIG. 1 is prepared, for example, in a method described in Japanese Patent Application Laid Open No. 2009-231601.

In the example of the near-field light illustrated in FIG. 1, GaAs and InAs are used; however, not only these materials but also a material which functions as a translucent quantum dot such as CuCl, GaN, or ZnO can be used.

Figure 2:
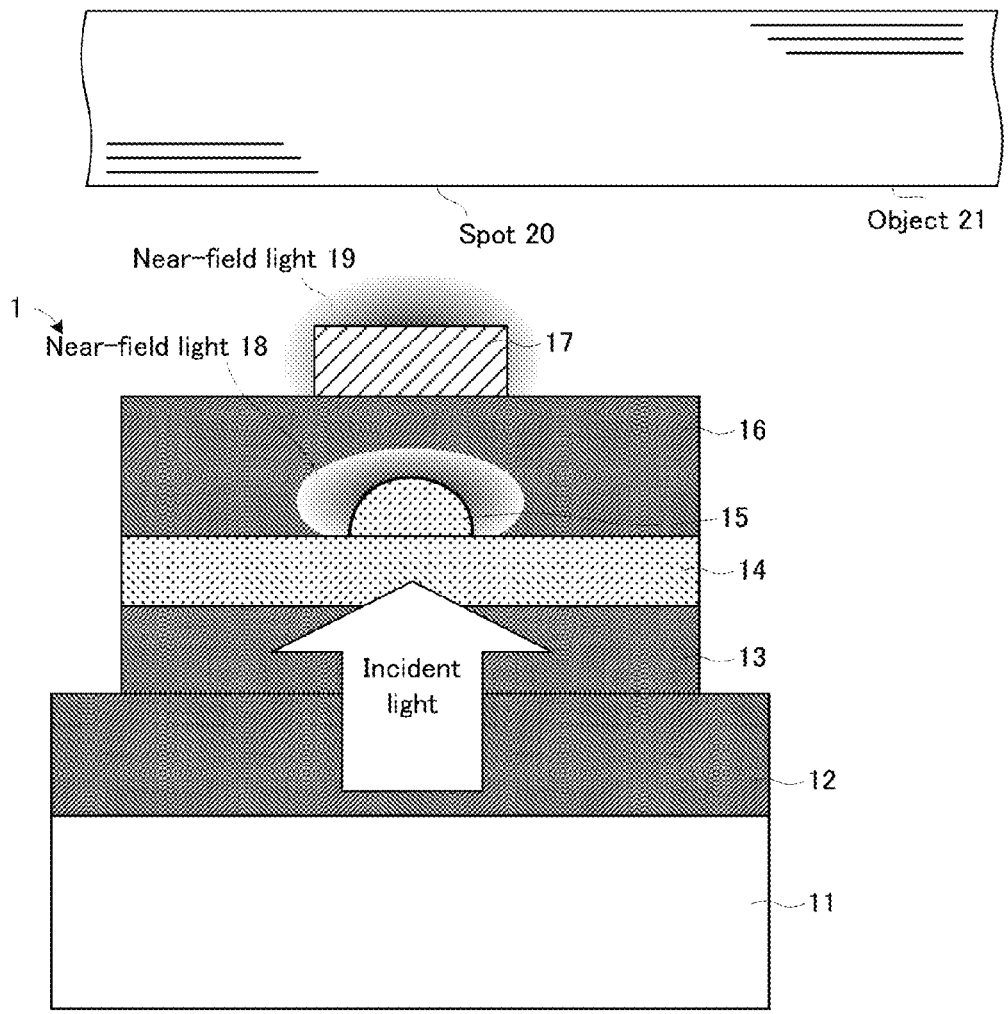
FIG. 2 is a diagram explaining an energy transfer in the near-field light device illustrated in FIG. 1.

Next, a method in which the near-field light device 1 illustrated in FIG. 1 transfers the energy of the incident light from the light source 11 will be explained with reference to FIG. 2. The incident light from the light source 11 is transmitted through the GaAs substrate 12, the GaAs buffer layer 13, and the InAs layer 14 and reaches to the InAs quantum dot 15, and then, near-field light 18 is generated in the surroundings of the InAs quantum dot 15. The energy of the generated near-field light 18 is transferred to the metal end 17 and becomes near-field light 19. The near-field light 19 after the transfer to the metal end 17 is transferred to a nano-spot 20 on a surface of an object 21 from the metal end 17 (i.e. the energy is transferred) when a distance between the object 21 and the metal end 17 is a distance which causes a near-field interaction (e.g. 20 nm (nanometers) or less). The nano-spot is a nano-order spot which is smaller than an optical diffraction limit.

If the object 21 is a magnetic recording medium, it is possible to make a small temperature-increase region by applying energy such as heat to the nano-spot, thereby forming magnetic recording bits with a small area (volume).

The energy transfer from the metal end 17 to the nano-spot of the object 21 is controlled by controlling ON/OFF of the light source 11. By this, for example, the magnetic recording bits are recorded.

The magnetic recording bit is several tens nanometers or less in size. It is hardly possible to narrow down the incident light to a spot which is less than or equal to a wavelength of the light in an optical method, and it is thus hardly possible to increase temperature of a region which is several tens nanometers in size (temperature increases in a region with a size of several hundred nanometers, which is an optical wavelength size). Moreover, if the metal end 17 is directly irradiated with the incident light, for example, by using an optical waveguide or the like, then, the metal end 17 likely becomes hot enough to melt.

By using the near-field light device 1 using the quantum dot to which the present invention is applied, one portion of the incident light is converted to the near-field light 18 by the quantum dot 15, and the near-field light 18 is transferred to the metal end 17 and becomes the near-field light 19. By this, temperature can be increased in the region which is several tens nanometers in the object 21 (e.g. a magnetic medium). A simulation study also shows that the metal end 17 does not become hot.

Thus, according to the present invention, the energy of the incident light is received by the quantum dot, which increasing temperature to be certainly increased in the region which is smaller than the wavelength of the light.

<Second Embodiment>

Next, a near-field light device 100 in which quantum dots are provided in two layers will be explained with reference to FIG. 3. The near-field light device 100 is provided with a light source 101, a GaAs substrate 102, a GaAs buffer layer 103, a first InAs layer 104, first quantum dots 105a and 105b, a first GaAs layer 106, a second InAs layer 107, a second quantum dot 108, a second GaAs layer 109, and a metal end 110. Except the two-stage configuration of the quantum dots, the near-field light device 100 has the same configuration as that of the near-field light device 1 illustrated in FIG. 1.

The plurality of first quantum dots 105a and 105b are formed on the first InAs layer 104, and incident light from the light source 101 is received by the plurality of first quantum dots 105a and 105b. The second quantum dot 108 is formed on the second InAs layer 107.

The number of the second quantum dots is less than the number of the first quantum dot (e.g. one second quantum dot with respect to four first quantum dots, one second quantum dot with respect to nine first quantum dots, etc.). The size of the second quantum dot is greater than the size of the first quantum dot (e.g. the first quantum dot with a diameter of 50 nm with respect to the second quantum dot with a diameter of 60 nm, the first quantum dot with a diameter of 15 nm with respect to the second quantum dot with a diameter of 20 nm, etc.).

The first quantum dots 105a and 105b and the second quantum dot 108 are configured such that the quantum dots in the lower layer (the first quantum dots 105a and 105b) and the quantum dot in the upper layer (the second quantum dot 108) satisfy a distance at which the quantum dots can be coupled by the near-field light interaction.

Figure 4:
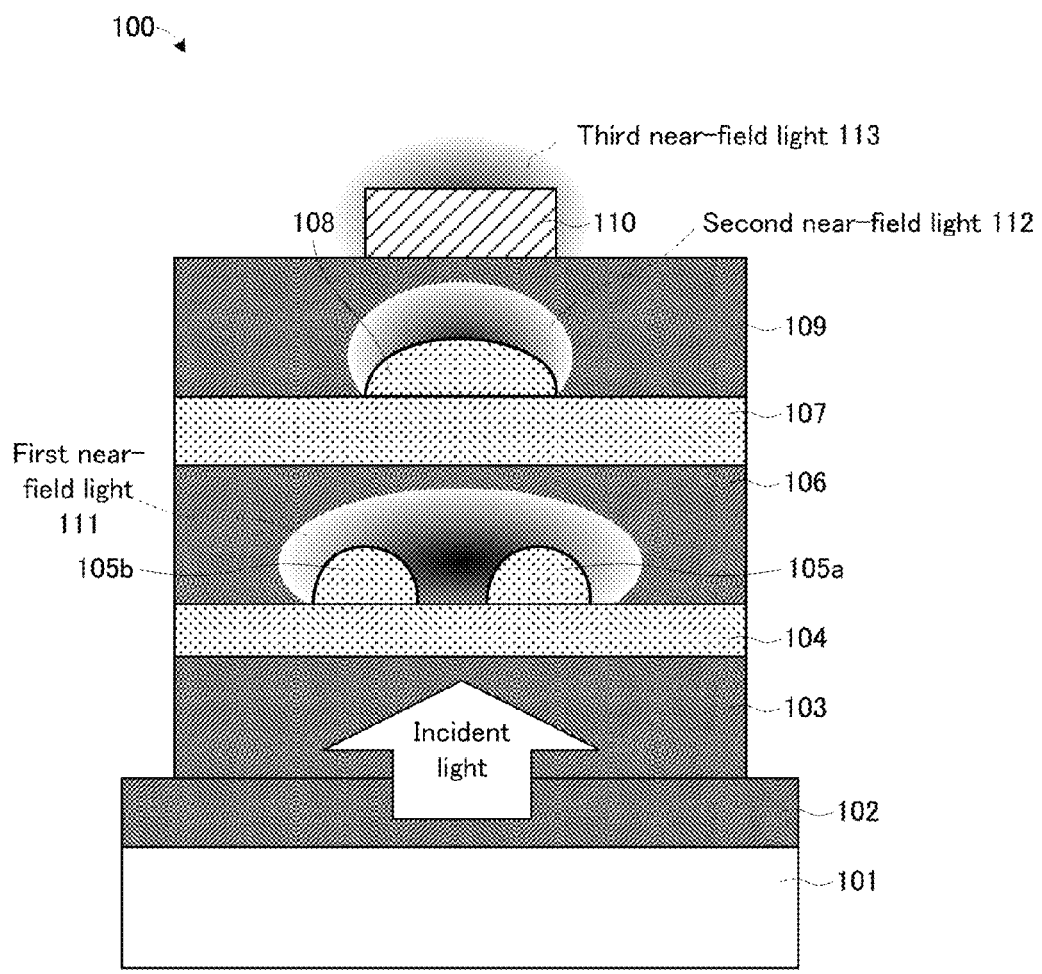
FIG. 4 is a diagram explaining an energy transfer in the near-field light device illustrated in FIG. 3.

With reference to FIG. 4, a method in which the near-field light device 100 transfers the energy of the incident light from the light source 101 will be explained. The incident light from the light source 101 is transmitted through the GaAs substrate 102, the GaAs buffer layer 103, and the InAs layer 104 and reaches to the first quantum dots 105a and 105b, and then, first near-field light 111 is generated in the surroundings of the first quantum dots 105a and 105b. Then, an energy level in a first excited state of the first quantum dots 105a and 105b and an energy level in a second excited state of the second quantum dot 108 become in a resonance state.

Due to the resonance state, the near-field interaction causes an energy transfer from the first quantum dots 105a and 105b to the second quantum dot 108, and second near-field light 112 is generated in the surroundings of the second quantum dot 108. The energy of the generated second near-field light 112 is transferred to the metal end 110, and third near-field light 113 is generated in the surroundings of the metal end 110. When there is a not-illustrated object in the surroundings of the metal end 110 at the distance which causes the near-filed interaction, the third near-field light 113 is transferred to a nano-spot of the object, resulting in an energy transfer.

By arranging the quantum dots in a plurality of layers, it is possible to efficiently concentrate the energy of the incident light. The plurality of quantum dots formed in the layer closest to the light source 101 (which are the first quantum dots 105a and 105b herein) are used to convert the incident light to the near-field light, and the energy is transferred to the quantum dot provided in the upper layer (which is the second quantum dot 108 herein). This facilitates the concentration of the energy on the micro region which is smaller than the wavelength of the light.

Moreover, as the number of the quantum dots irradiated with the incident light (an area occupied by the quantum dots) increases, more of the incident light can be converted to the near-field light, and thus, the energy can be efficiently concentrated on the metal end. The incident light is converted not only by the quantum dots in the lower layer but also by the quantum dot in the upper layer irradiated with the incident light, and the energy of the incident light, which is converted to the near-field light by each of the quantum dots in the lower layer or the upper layer, is concentrated on the metal end 110.

Figure 5:
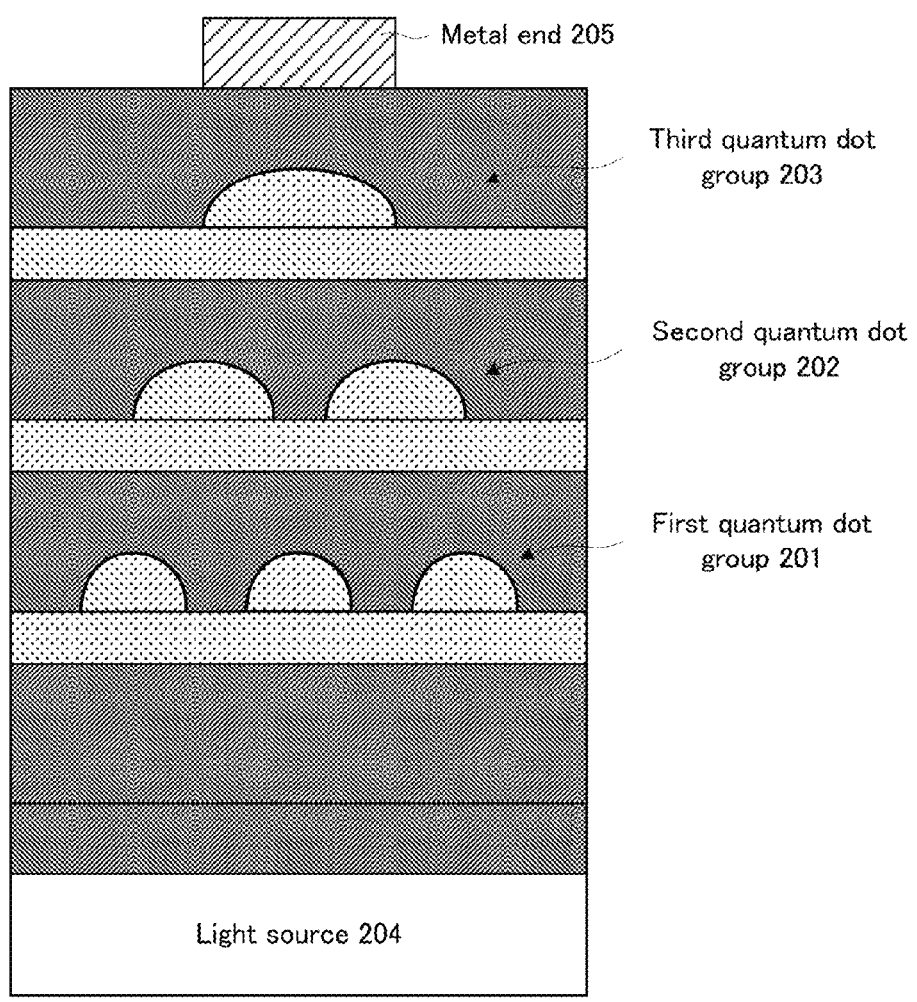
FIG. 5 is a diagram illustrating a structure of a near-field light device in which quantum dot groups are arranged in three layers.

Moreover, as illustrated in FIG. 5, three layers of quantum dots may be provided. Each of the quantum dots in a first quantum dot group 201 located in the lower layer receives incident light from a light source 204 and generates first near-field light (not illustrated). The first quantum dot group 201 and a second quantum dot group 202 in the middle layer become in the resonance state. An energy transfer occurs from the first quantum dot group 201 to the second quantum dot group 202, and second near-field light (not illustrated) is generated in each of the quantum dots in the second quantum dot group 202.

Then, in the same manner, the second quantum dot group 202 and a third quantum dot group 203 in the upper layer become in the resonance state. An energy transfer occurs from the second quantum dot group 202 to the third quantum dot group 203, and third near-field light (not illustrated) is generated in each of the quantum dots in the third quantum dot group 203. The energy of the generated third near-field light is absorbed by a metal end 205. The absorbed energy is converted to energy such as light and heat, and is released.

The layer thickness of each layer, the height of the quantum dots in each layer, and the size of the quantum dots are designed such that the quantum dots in the respective layers are at a distance at which the quantum dots can be coupled by the near-field light interaction between the layers (between the lower layer and the middle layer, and between the middle layer and the upper layer); namely, such that the quantum dots in the lower layer and the middle layer can be coupled by the near field light interaction, and such that the quantum dots in the middle layer and the upper layer can be coupled by the near field light interaction.

In the example illustrated in FIG. 5, the number of the quantum dots which belong to each group decreases in the order of the first quantum dot group 201, the second quantum dot group 202, and the third quantum dot group 203. Moreover, the size of the quantum dots which belong to each group is designed to increase in the order of the first quantum dot group 201, the second quantum dot group 202, and the third quantum dot group 203. Those are designed to increase energy conversion efficiency and to concentrate the energy on the nano-spot which is smaller than the wavelength of the light.

In FIG. 5, the configuration in which there are provided the three quantum dot groups is explained; however, not only the three layers of quantum dot groups but also three or more layers of quantum dot groups may be provided. Moreover, as the number of the quantum dots irradiated with the incident light (the area occupied by the quantum dots) increases, more of the incident light can be converted to the near-field light, and thus, the energy can be efficiently concentrated on the metal end. The incident light is converted not only by the quantum dots in the lower layer but also by the quantum dot in the upper layer or the middle layer irradiated with the incident light, and the energy of the incident light, which is converted to the near-field light by each of the quantum dots in the lower layer, the middle layer, and the upper layer, is concentrated on the metal end 205.

<First Modified Example>

Figure 3:
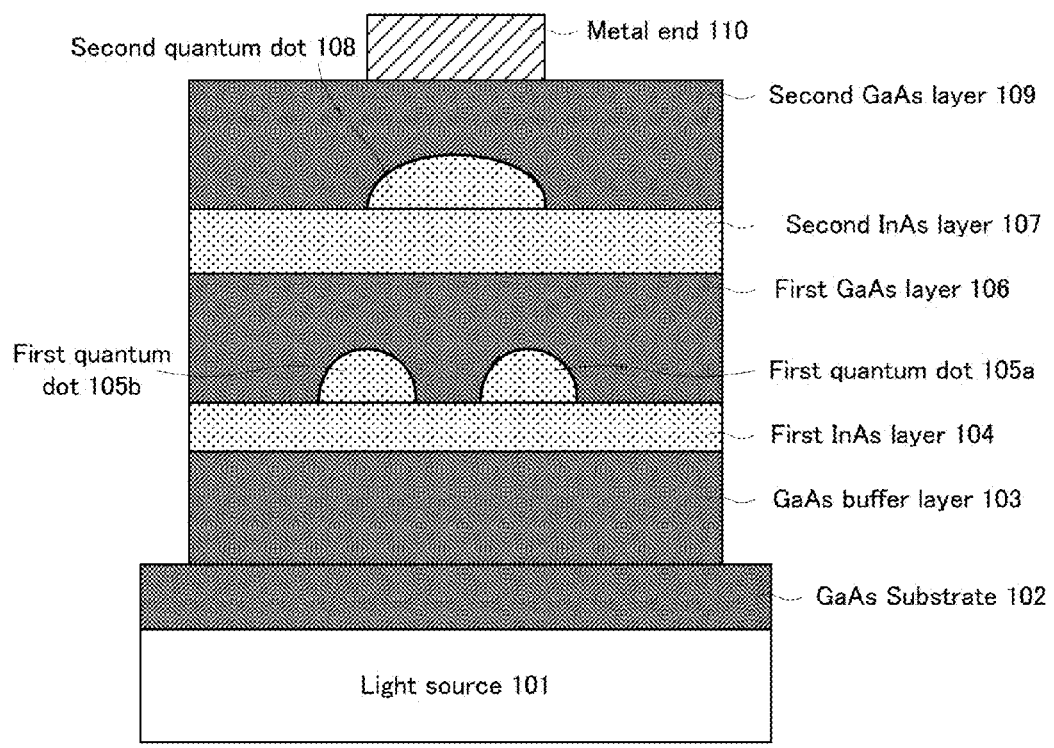
FIG. 3 is a diagram illustrating a structure of a near-field light device in a second embodiment of the present invention.
Figure 6:
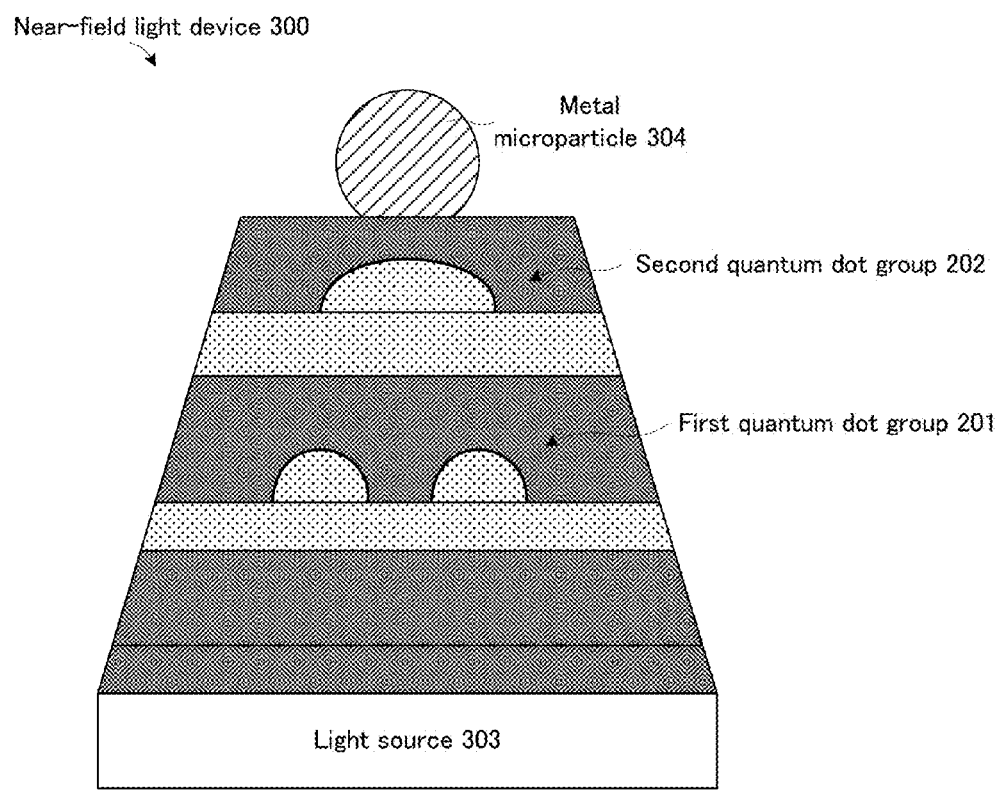
FIG. 6 is a diagram illustrating a structure of a near-field light device having a mesa structure.

FIG. 6 is a diagram illustrating a modified example of the near-field light device which is provided with the two-layer quantum dot groups illustrated in FIG. 3. A near-filed optical device 300 illustrated in FIG. 6 is provided with a first quantum dot group 301, a second quantum dot group 302, a light source 303, and a metal nano-particle 304. FIG. 6 illustrates a structure in which the first and second quantum dot groups are formed in a mesa structure (a taper shape).

By using the mesa structure, it is possible to increase the efficiency of an energy transfer from the first quantum dot group 301 in the lower layer to the second quantum dot group 302 in the upper layer because an area of the upper layer becomes less than an area of the lower area. Moreover, the setting of a side surface in the taper shape leads to simplification and time reduction of an etching process of the near-field light device 300.

Moreover, by setting the metal end to be the metal nano-particle 304, energy concentrated on the second quantum dot group 302 in the upper layer can be absorbed, more efficiently. In particular, if a metal material which constitutes the metal nano-particle 304 is gold (Au), a broad energy band of gold (Au) allows not-wasted energy absorption.

<Second Modified Example>

Figure 7:
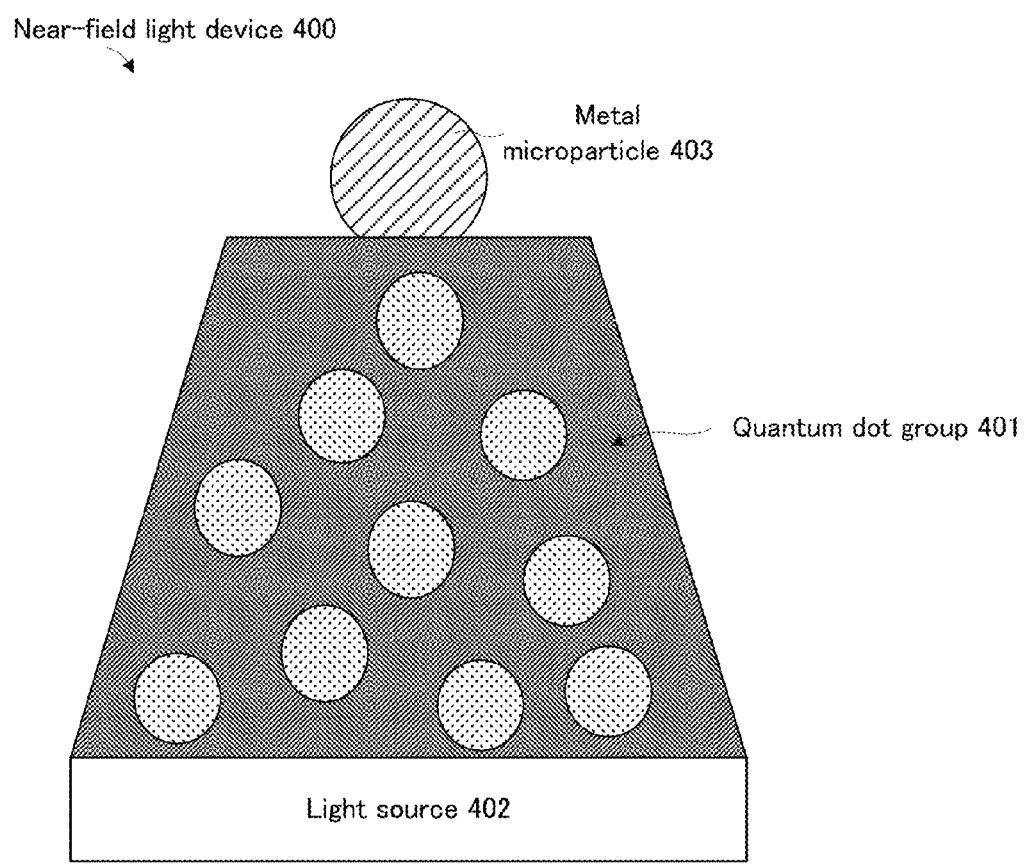
FIG. 7 is a diagram illustrating a structure of a near-field light device in which quantum dots are dispersed in a mesa structure.

FIG. 7 is a diagram illustrating a near-field light device 400 in which quantum dots which consists of InAs are dispersed in a GaAs medium. The near-field light device 400 is provided with a quantum dot group 401 dispersed in a mesa structure, a light source 402, and a metal nano-particle 403.

The mesa structure is configured to gradually narrow in a direction from the lower layer to the upper layer (from the light source 402 to the metal nano-particcle 403), and the number of quantum dots is configured to decrease from the lower layer toward the upper layer. Incident light from the light source 402 becomes near-field light due to the quantum dots located in the lower layer, and an energy transfer causes the generation of near-field light in the quantum dots in the upper layer. In the end, energy is concentrated on the metal nano-particle 403.

The structure as described above in which the quantum dots are dispersed in the mesa structure can be manufactured, simply and in large quantities, by etching with a mask a material in which the InAs quantum dots are uniformly dispersed in the GaAs medium, or by performing imprinting which uses a mold in which a concavo-convex structure pattern opposite to the mesa structure is carved.

<Third Modified Example>

Figure 8:
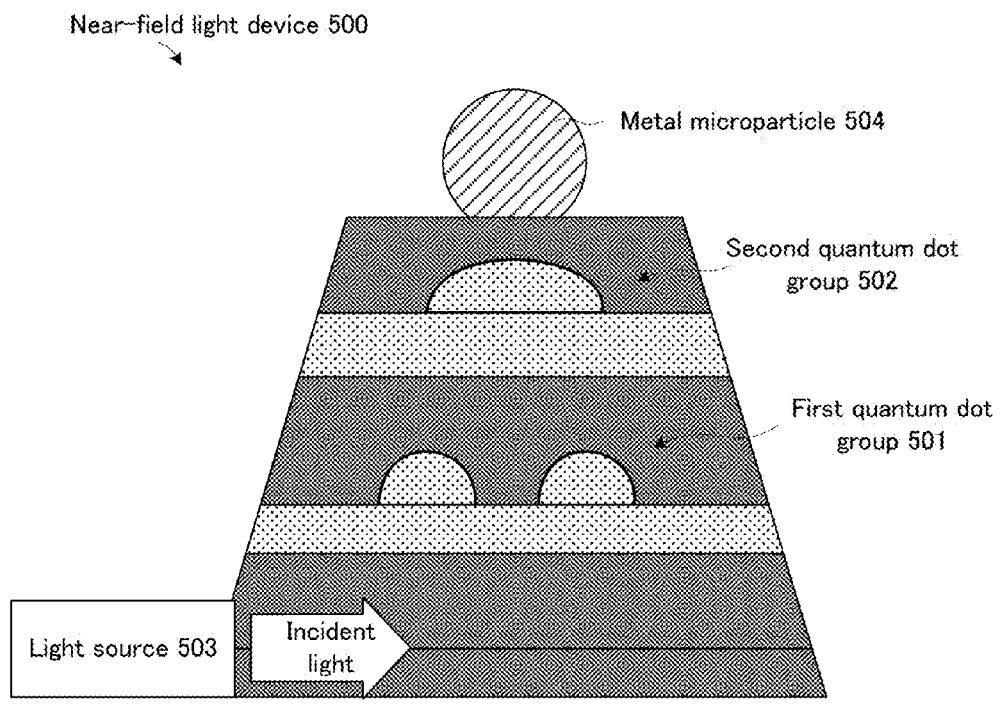
FIG. 8 is a diagram illustrating a structure of a near-field light device in which the position of a light source is changed.

FIG. 8 illustrates a configuration in which the position of the light source of the incident light of the near-field light device illustrated in FIG. 6 is changed. A near-field light device 500 illustrated in FIG. 8 is provided with a first quantum dot group 501, a second quantum dot group 502, a light source 503, and a metal nano-particle 504. FIG. 8 illustrates a structure in which the first and second quantum dot groups are formed in a mesa structure (a taper shape)

The light source 503 is located, not at a position which allows incident light to enter from a bottom surface of the mesa structure, but at a position which allows the incident light from a side surface of the mesa structure. Restriction on the position of the light source can be eliminated, and thus, the size of the device itself can be reduced.

It is also possible to set the position of the light source such that an entire surface of the mesa structure is irradiated with the incident light without locating the light source at the position illustrated in FIG. 8.

<Application Example>

FIG. 9 are diagrams illustrating an example in which the near-field light device, explained with reference to FIG. 1 to FIG. 8, equipped in a magnetic head. As illustrated in FIG. 9, at an end of an arm 51, a magnetic head 52 and a near-field light device 53 are disposed. The arm 51 is controlled to float an end portion of the arm 51 in which the magnetic head 52 and the near-field light device 53 are disposed, at a position at which a distance between the end portion and a magnetic recording medium 54 causes the near-field interaction.

On the basis of a record signal, ON/OFF of a light source (not illustrated) of the near-field light device 53 is controlled, by which an energy transfer from an output end (or a metal nano-particle) of the near-field light device 53 to a nano-spot of the magnetic recording medium 54 is controlled. By this, the energy transfer occurs in the nano-spot on the magnetic recording medium 54 when the light source is ON, and the magnetic recording bits are recorded.

Due to the energy supplying to the nano-spot, magnetic coercivity of the nano-spot is reduced. At the same time, a magnetic field is applied from the magnetic head 52 to perform magnetization reversal, by which the recording is performed. The size of the output end (or metal nano-particle) of the near-field light device 53 is set such that the size of the nano-spot generated in the near-field light device 53 is substantially equal to a recording dot size on the magnetic recording medium 54.

Moreover, by using the near-field light device of the present invention as a near-field light source, instead of an optical probe used for a conventional scanning near-field light microscope, it is possible to make a small spot of the near-field light, thereby obtaining a high-resolution image.

Incidentally, the "metal end 17", the "metal end 110", the "metal end 205", the "metal nano-particle 304", the "metal nano-particle 403", and the "metal nano-particle 504" are one example of the "output end" of the present invention.

<Embodiment of Recording Apparatus>

Figure 10:
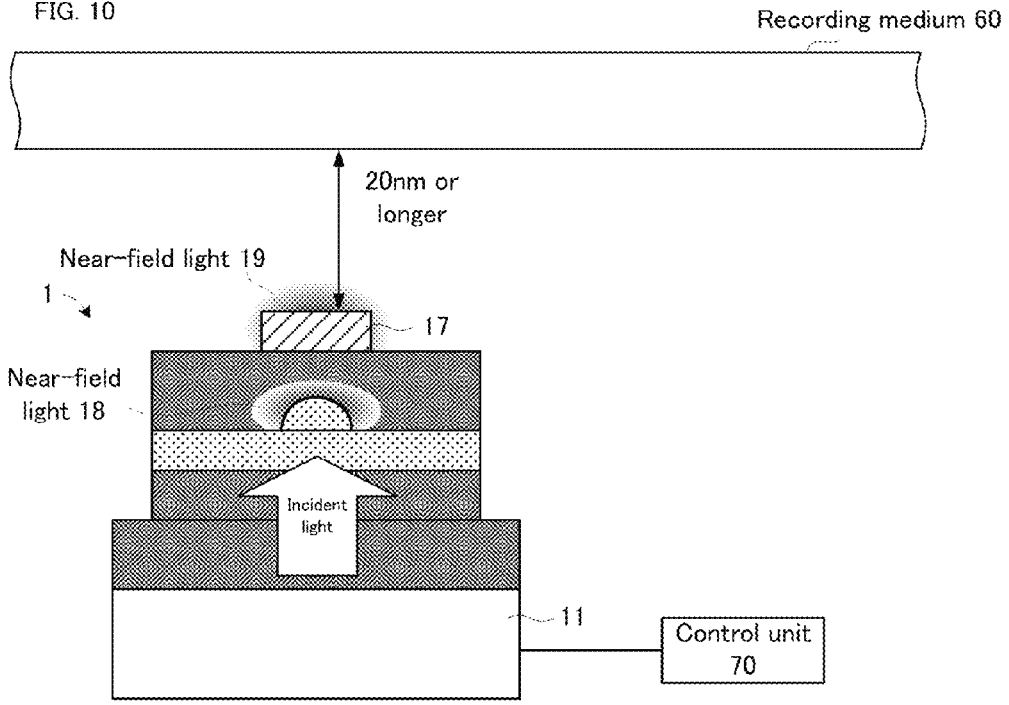
FIG. 10 is a diagram explaining a recording apparatus in an embodiment of the recording apparatus of the present invention.

FIG. 10 is a diagram illustrating a basic concept of a recording apparatus. The recording apparatus is provided with the near-field light device 1 illustrated in FIG. 1 and a control unit 70, and performs recording on a recording medium 60. The recording medium 60 includes a recording material a state of which is changed by heat generated by near-field light or near-field light energy, to form record marks. The recording medium 60 also includes metal which consists of, for example, gold (Au), because the recording medium 60 forms the near-field light together with the metal end 17.

When a distance between the metal end 17 at the end of the near-field light device 1 and the recording medium 60 is greater than or equal to a predetermined distance (e.g. 20 nm or more), the near-field light 18 is generated in the quantum dot 15 if the light source 11 is turned ON by the control unit 70, and the energy of the near-field light 18 is transferred to the metal end 17, and the near-field light 19 is generated in the surroundings of the metal end 17. If the distance between the metal end 17 and the recoding medium 60 is greater than or equal to the predetermined distance, the near-field light does not cause the interaction on the side of the recording medium 60.

Figure 11:
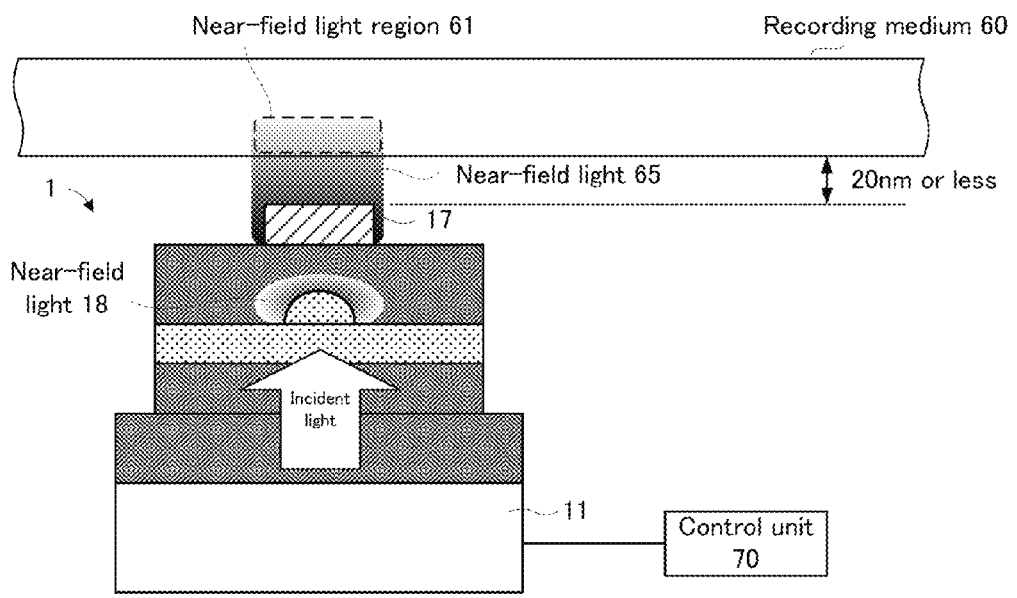
FIG. 11 is a diagram explaining the operation of the recording apparatus of the present invention.

As illustrated in FIG. 11, both or either of the recording medium 60 and the near-field light device 1 are displaced, and when the distance between the metal end 17 at the end of the near-field light device 1 and the recording medium 60 is less than or equal to the predetermined distance (e.g. 20 nm or less), the near-field light 18 is generated in the quantum dot 15 if the light source 11 is turned ON by the control unit 70, and the energy of the near-field light 18 is transferred to the metal end 17. Then, near-field light 65 is generated so as to surround the metal end 17 and a near-field light region 61 which is one portion of the recording medium 60. Then, the metal end 17 and the near-field light region 61 which is one portion of the recording medium 60 generate the near-field light 65 in one united body. Due to the energy of the near-field light 65, the recording medium 60 itself (the near-field light emission region 61 and surroundings thereof) generates heat. If the recording medium 60 uses a material a state of which is changed by heat, the record marks are formed by the heat. Moreover, if the recording medium 60 is a magnetic recording medium, magnetic coercivity of the near-field light emission region 61 is reduced due to that the recording medium 60 itself (the near-field light emission region 61 and the surroundings thereof) generates heat, and the magnetic recording can be performed by a magnetic field generated by a not-illustrated recording head.

Figure 12:
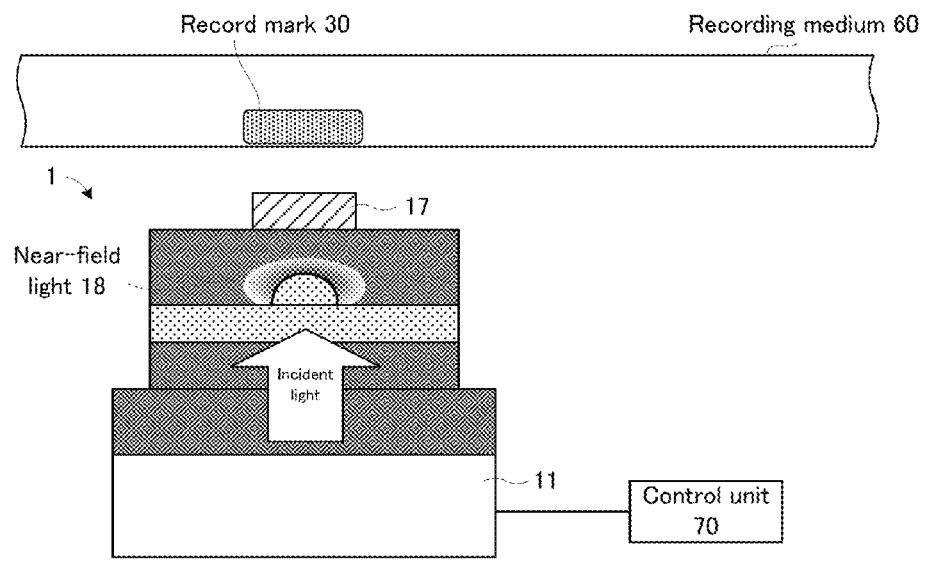
FIG. 12 is a diagram explaining the operation of the recording apparatus of the present invention.
Figure 13:
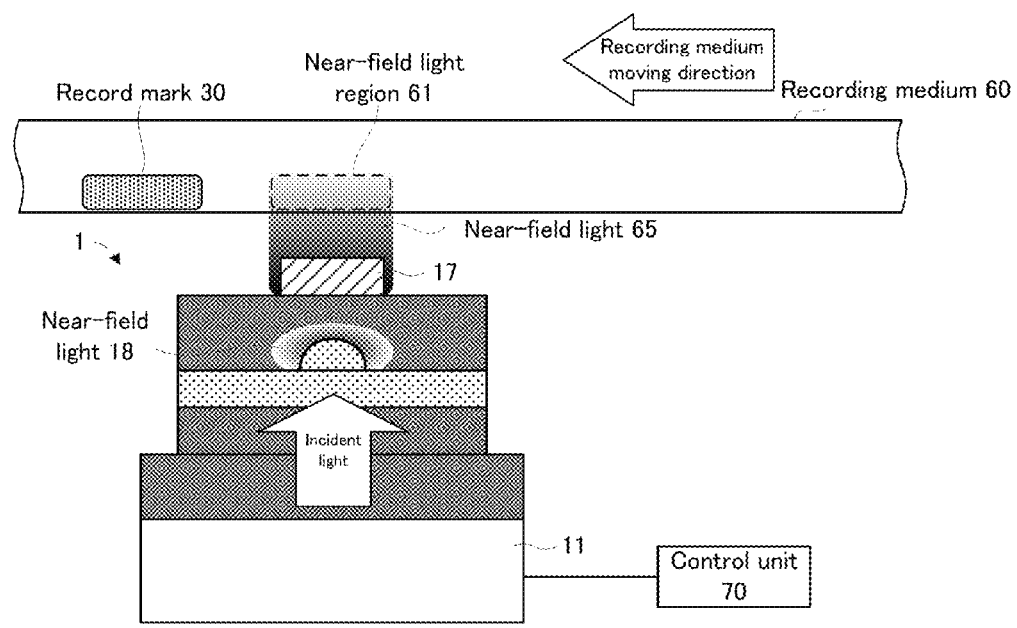
FIG. 13 is a diagram explaining the operation of the recording apparatus of the present invention.

FIG. 12 illustrates a state in which the light source 11 is turned ON by the control unit 70 for a time long enough to form a record mark 30 and in which the record mark 30 is formed on the recording medium 60 due to the energy of the generated near-field light 65. After the record mark is formed, the light source 11 is turned OFF by the control unit 70, and the near-field light 18 is not generated. Then, due to the move or rotation of the recording medium 60, or the move of the near-field light device 1, a recording position is moved. In FIG. 13, the recording medium 60 is moved to the right on the paper, and the left side of the record mark 30 becomes a new near-field light region 61. The control unit 70 turns on the light source 11 again and forms a new record mark by using the near-field light 65 in the same manner as the recording method described above. As described above, the control unit 70 performs the ON/OFF control of the light source 11 on the basis of record information to be recorded, and the distance between the metal end 17 and the recording medium 60 is maintained at the predetermined distance or less (e.g. 20 nm or less), by which information can be continuously recorded, for example, on the recording medium 60 which rotates at a constant speed.

<Modified Example 1 of Recording Apparatus>

Figure 14:
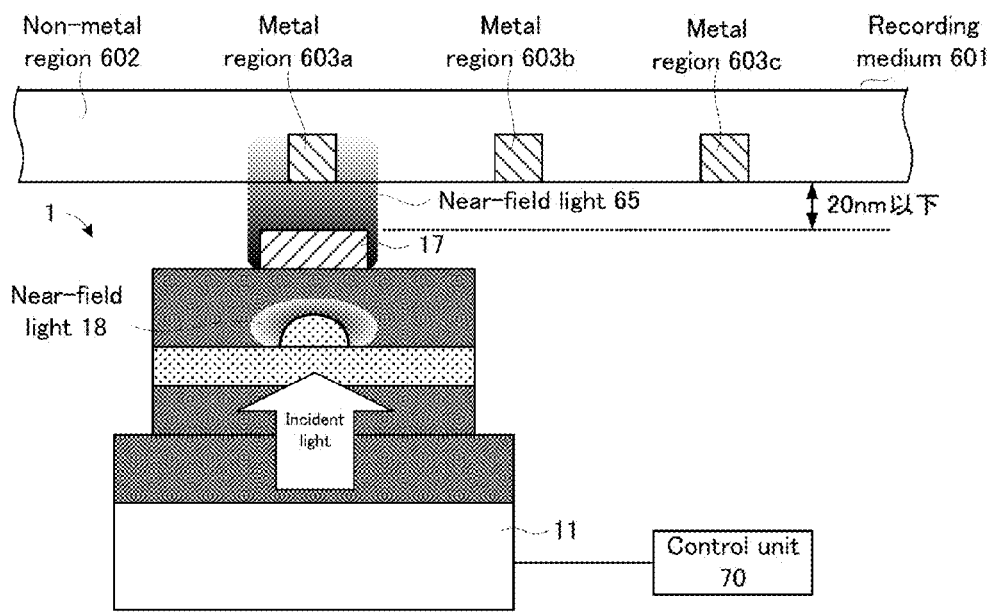
FIG. 14 is a diagram explaining a recording apparatus in a first modified example of the recording apparatus of the present invention.

FIG. 14 illustrates a modified example 1 of the recording apparatus. A configuration other than a recording medium 601 is the same as that of the recording apparatus illustrated in FIG. 10. The recording medium 601 is provided with a non-metal region 602 and island-shaped separate metal regions 603a to 603c. The non-metal region 602 consists of resins, glass, or the like, and includes a material which does not generate the near-field light together with the metal end 17 of the near-field light device 1. The metal regions 603a to 603c are magnetic materials including metal such as gold (Au) which generates the near-field light together with the metal end 17 of the near-field light device 1. Each of the metal regions 603a to 603c is isolated by the non-metal region 602. Moreover, the non-metal region 602 may consist of not only non-metal but also of a nonmagnetic material which does not generate the near-field light together with the metal end 17 of the near-field light device 1.

If information is recorded on the recording medium 601, a distance between the metal end 17 at the end of the near-field light device 1 and the recording medium 601 is maintained at a predetermined distance or less (e.g. 20 nm or less), and the light source 11 is turned ON by the control unit 70. The near-field light 18 is generated by incident light in the quantum dot 15, and the energy of the near-field light 18 is transferred to the metal end 17. Then, the near-field light 65 is generated so as to surround the metal end 17 and the metal region 603a of the recording medium 601. The metal end 17 and the metal region 603a generate the near-field light 65 in one united body. Due to the energy of the near-field light 65, the metal region 603a itself (the metal region 603a and surroundings thereof) generates heat. Then, magnetic coercivity of the metal region 603a is reduced, and the magnetic recording can be performed in accordance with a magnetic field generated by a not-illustrated recording head.

Figure 15:
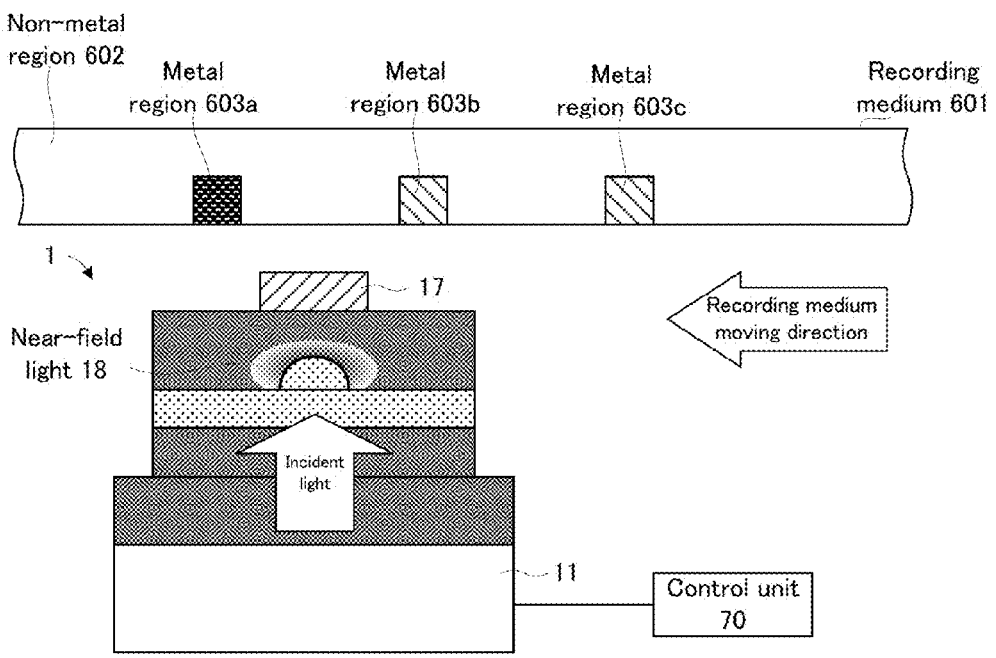
FIG. 15 is a diagram explaining the operation of the recording apparatus in the first modified example of the present invention.

FIG. 15 illustrates a state in which the light source 11 is turned ON by the control unit 70 for a time long enough to perform the magnetic recording on the metal region 603a and in which the recording in the metal region 603a is completed due to the energy of the generated near-field light 65. Then, due to the move or rotation of the recording medium 601, or the move of the near-field light device 1, the recording position is moved. In other words, the metal end 17 at the end of the near-field light device 1 is located to face the non-metal 602 between the metal region 603a and the metal region 603b. At this time, the light source 11 is turned OFF by the control unit 70 and is controlled not to generate the near-field light 18. Moreover, the control unit 70 may be controlled not to completely turn the incident light OFF, but to reduce quantity of the incident light when the non-metal region 602 and the metal end 17 face each other, and to keep the energy of the near-field light 18 to be small.

Figure 16:
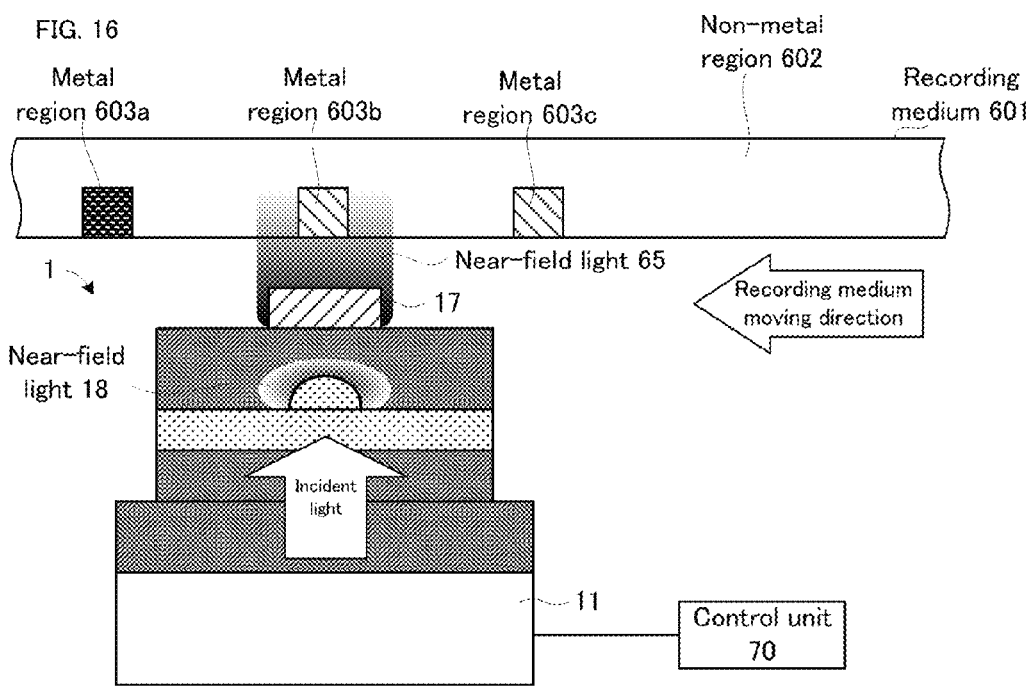
FIG. 16 is a diagram explaining the operation of the recording apparatus in the first modified example of the present invention.

In FIG. 16, the recording medium 601 is moved from the right to the left on the paper, and thus, the metal end 17 faces the metal region 603b. At this timing, the control unit 70 turns ON the light source 11 again, and records information into the metal region 603b in the same manner as in the metal region 603a illustrated in FIG. 14. Moreover, the information recording is performed in the same manner even in the recording region 603c.

The near-field light device 1 as illustrated in FIG. 1 is used in FIG. 10 to FIG. 16; however, needless to say, the near-field light device as illustrated in FIG. 2 to FIG. 9 can be used.

In the recording apparatuses illustrated in FIG. 10 to FIG. 16, the metal end of the near-field light device 1 and a partial region on the recording medium form the near-field light in one united body. The partial region on the recording medium directly generates heat due to the energy of the near-field light. In a conventional HAMR method, heat caused by the near-field light generated on the metal end is transmitted (or radiated) from the metal end to the magnetic recording medium. In the present invention, however, the recording medium directly generates heat, and thus, the nano-spot on the recording medium can be efficiently heated.

<Third Embodiment>

Figure 17:
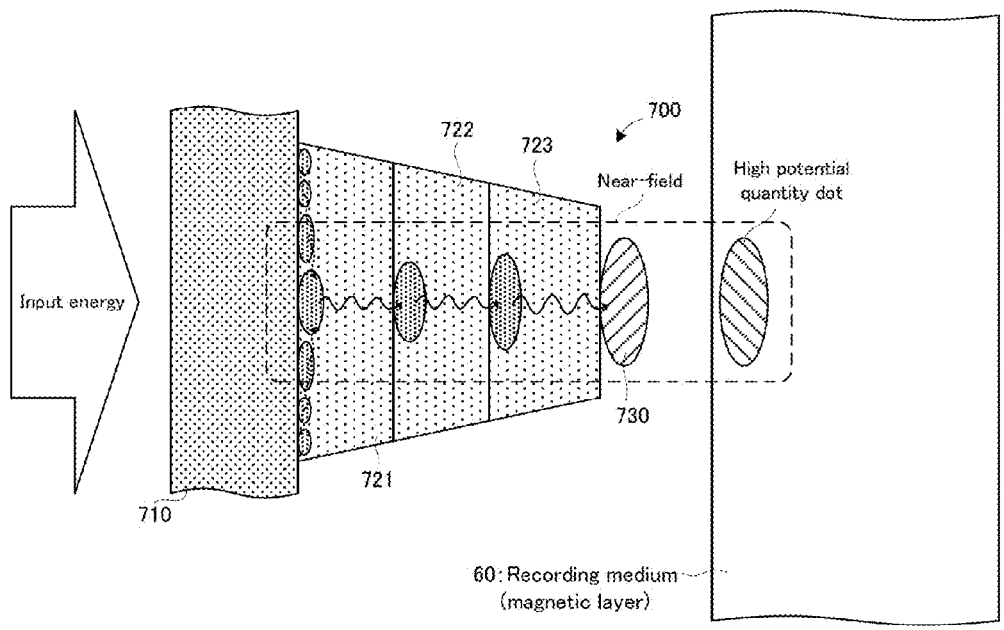
FIG. 17 is a diagram illustrating a structure of a near-field light device in a third embodiment of the present invention.

A third embodiment of the near-field light device of the present invention will be explained with reference to FIG. 17. FIG. 17 is a diagram illustrating a structure of the near-field light device in the third embodiment of the present invention. Incidentally, wavy arrows in the drawing indicate energy transmission.

In FIG. 17, a near-field light device 700 is provided with a substrate 710, an optical nano-fountain layer 721 laminated on the substrate 710 and including, for example, a plurality of InAs quantum dots, a quantum dot layer 722 laminated on the optical nano-fountain layer 721, a quantum dot layer 723 laminated on the quantum dot layer 722, and a metal end 730 laminated on the quantum dot layer 723.

In the optical nano-fountain layer 721, a plurality of relatively small quantity dots are arranged to surround therewith a relatively large quantity dot which is disposed near the center.

By virtue of such a configuration, at least one portion of the energy of near-field light generated in the relatively small quantity dots which receive energy (i.e. incident light) inputted from a bottom surface of the substrate 710 (the left side of the paper of FIG. 17) is concentrated on the relatively large quantity dot disposed near the center. Thus, the energy inputted to the near-field light device 700 can be efficiently transferred to the metal end 730, which is extremely useful in practice.

<Fourth Embodiment>

Figure 18:
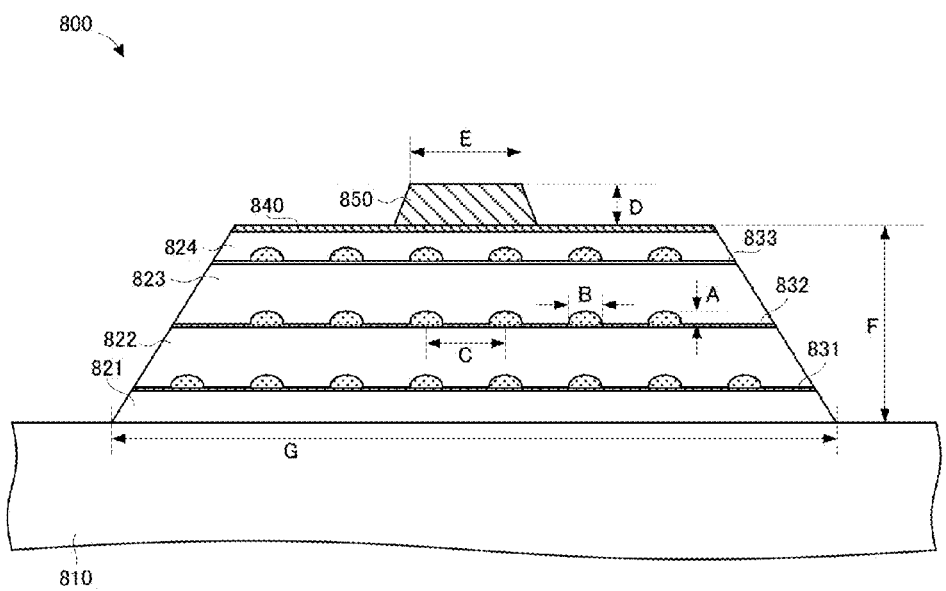
FIG. 18 is a diagram illustrating a structure of a near-field light device in a fourth embodiment of the present invention.
Figure 19:
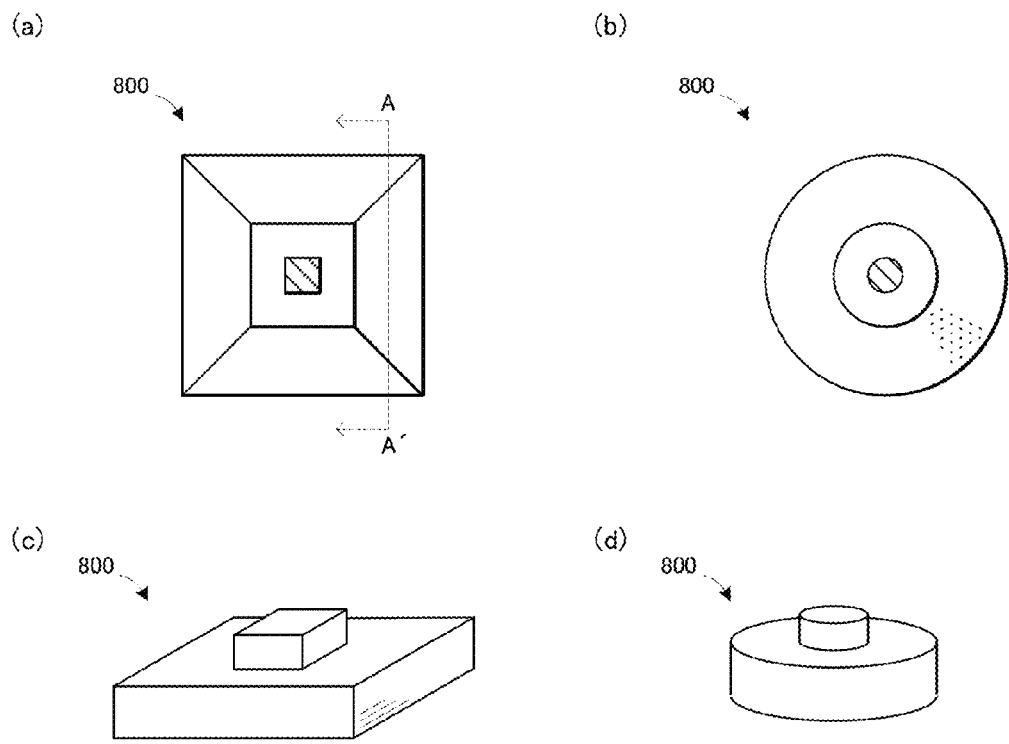
FIG. 19 are plan views and perspective views illustrating one example of an entire shape of the near-field light device in the fourth embodiment of the present invention.

A fourth embodiment of the near-field light device of the present invention will be explained with reference to FIG. 18 to FIG. 20. FIG. 18 is a diagram illustrating a structure of the near-field light device in the fourth embodiment of the present invention.

In FIG. 18, a near-field light device 800 is provided with a substrate 810, a GaAs layer 821 formed on the substrate 810, an InAs quantity dot layer 831 formed on the GaAs layer 821, a GaAs layer 822 formed on the InAs quantity dot layer 831, an InAs quantity dot layer 832 formed on the GaAs layer 822, a GaAs layer 823 formed on the InAs quantity dot layer 832, an InAs quantity dot layer 833 formed on the GaAs layer 823, a GaAs layer 824 formed on the InAs quantity dot layer 833, a Ti layer 840 formed on the GaAs layer 824, and a metal end 850 formed on the Ti layer 840 and including, for example, Au or the like.

Now, one example of the size of each layer and each member in the near-field light device 800 will be given.

The thickness of each of the GaAs layers 821 and 824 is, for example, 25 nm. On the other hand, the thickness of each of the GaAs layers 822 and 823 is, for example, 50 nm. The thickness of each of the InAs layers 831, 832 and 833 (except quantity dots) is, for example, 0.5 nm to 1 nm. The thickness of the Ti layer 840 is, for example, 5 nm.

The average height of the InAs quantity dots (refer to "A" in FIG. 18) is, for example, 7 nm. The average width of the InAs quantity dots (refer to "B" in FIG. 18) is, for example, 25 nm. The average center-to-center distance (i.e. average pitch) between two InAs quantity dots adjacent to each other (refer to "C" in FIG. 18) is, for example, 50 nm. The height of the metal end 850 (refer to "D" in FIG. 18) is, for example, 30 nm. The width of the metal end 850 (refer to "E" in FIG. 18) is, for example, 60 nm. The height of a mesa structure (refer to "F" in FIG. 18) is, for example, 150 nm. The width of the mesa structure (refer to "G" in FIG. 18) is, for example, 400 nm.

The total number of the InAs quantity dots included in the mesa structure is, for example, 140. Moreover, the density of the InAs quantity dots is, for example, 400 dots/$\mu m^2$.

Next, an entire shape of the near-field light device 800 will be explained with reference to FIG. 19. FIG. 19 are plan views and perspective views illustrating one example of the entire shape of the near-field light device in the fourth embodiment of the present invention.

The entire shape of the near-field light device 800 is typically square pyramidal (refer to FIG. 19(a)) or conical (refer to FIG. 19(b)). The entire shape of the near-field light device 800 is not limited to the square pyramidal or conical shape, but may be, for example, polygonal prismatic such as trigonal prismatic and quadratic prismatic, columnar, polygonal pyramidal, rectangular (refer to FIG. 19(c)), disk-shaped (refer to FIG. 19(d)), and the like.

Next, the arrangement of the InAs quantity dots of the mesa structure of the near-field light device 800 will be explained with reference to FIG. 20. FIG. 20 illustrate one example of an A-A' cross sectional view of FIG. 19(a) (i.e. diagrams planarly illustrating an arrangement state of the quantity dots included in each of the "InAs quantity dot layer 831", the "InAs quantity dot layer 832", and the "InAs quantity dot layer 833").

Figure 20:
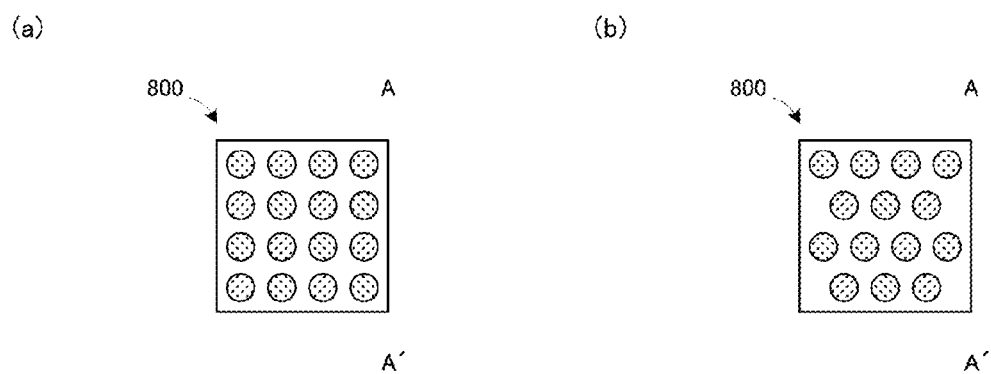
FIG. 20 are diagrams illustrating one example of an A-A' cross sectional view of FIG. 19(a).

The InAs quantity dots may be arranged in a lattice pattern as illustrated in FIG. 20(a), or may be arranged in a triangular lattice pattern as illustrated in FIG. 20(b). The InAs quantity dots may adopt various types of arrangement other than the arrangement illustrated in FIG. 20 as one example.

<First Modified Example>

Figure 21:
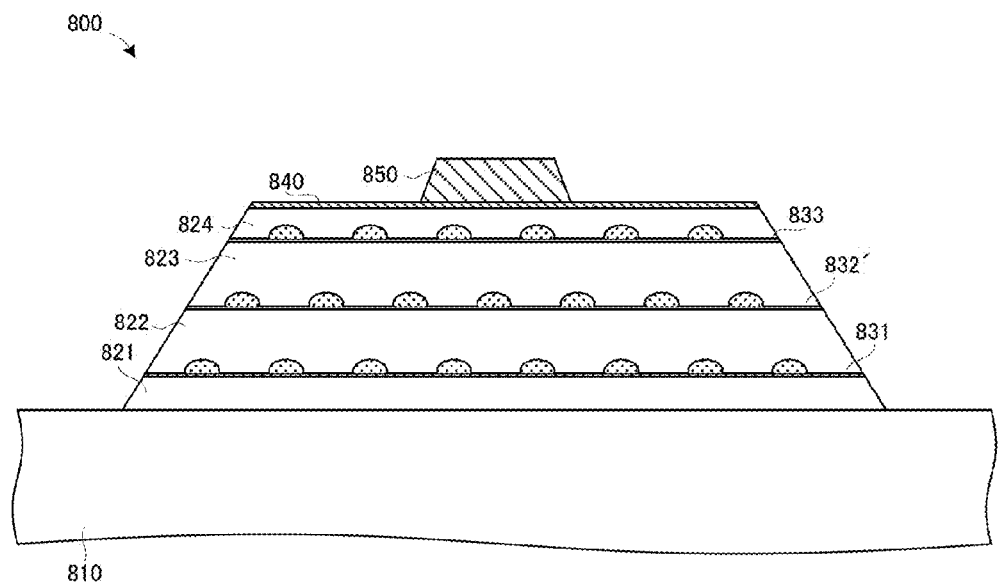
FIG. 21 is a diagram illustrating one example of a first modified example of the near-field light device in the fourth embodiment of the present invention.

Next, a first modified example of the near-field light device 800 in the fourth embodiment will be explained with reference to FIG. 21. FIG. 21 is a diagram illustrating one example of the first modified example of the near-field light device in the fourth embodiment of the present invention.

Particularly in the first modified example, a plurality of quantity dots included in an InAs quantity dot layer 832' are arranged such that each of the quantity dots included in an InAs quantity dot layer 832' does not overlap the plurality of quantity dots included in the InAs quantity dot layer 831 when viewed in a plane from above the near-field light device 800.

<Second Modified Example>

Figure 22:
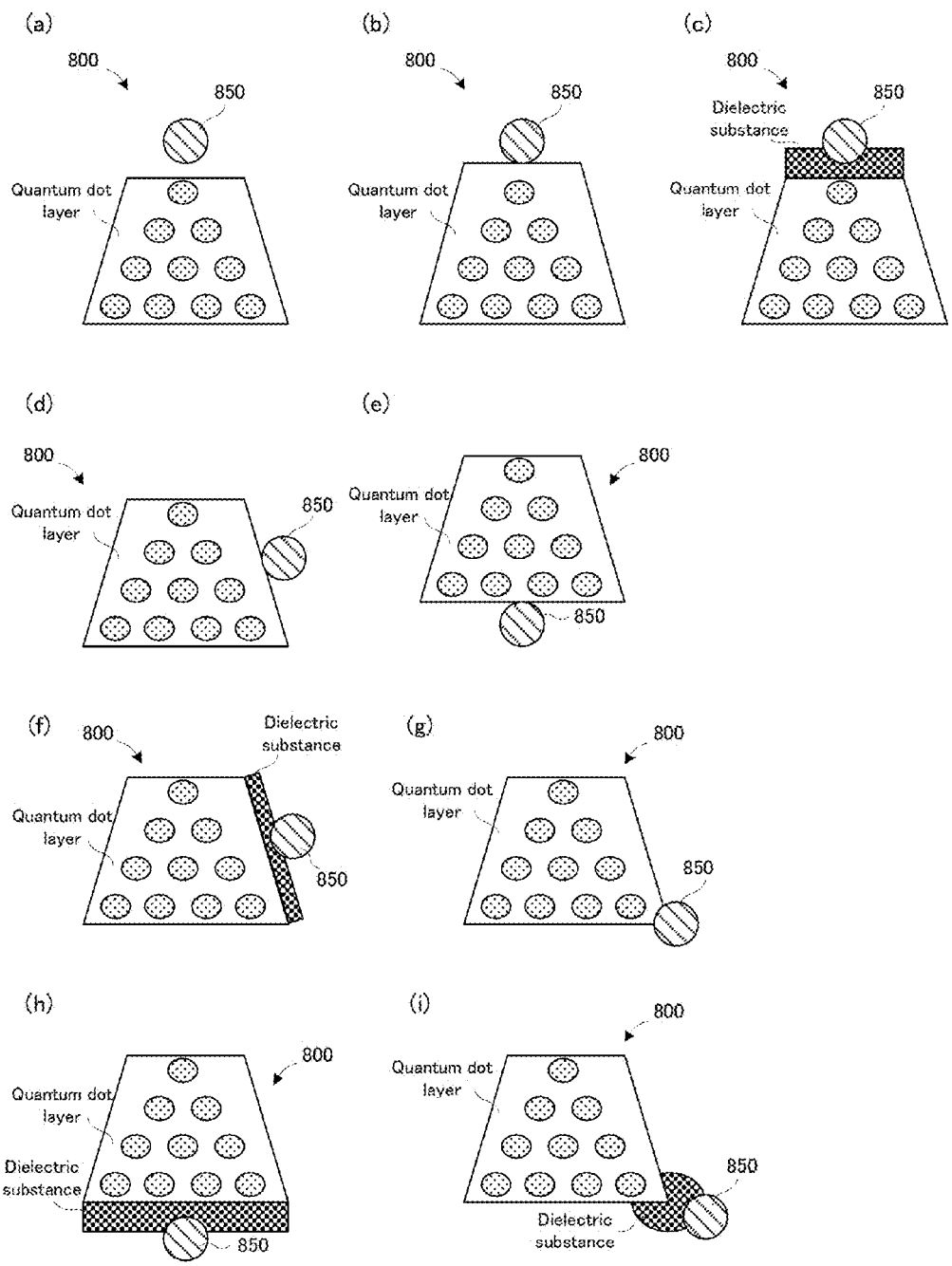
FIG. 22 are diagrams illustrating one example of a second modified example of the near-field light device in the fourth embodiment of the present invention.

Next, a second modified example of the near-field light device 800 in the fourth embodiment will be explained with reference to FIG. 22. FIG. 22 are diagrams illustrating one example of the second modified example of the near-field light device in the fourth embodiment of the present invention. Particularly in the second modified example, a positional relation between the metal end 850 and the quantity dot layer (i.e. the mesa structure) will be explained.

As illustrated in FIG. 22(a), a gap may be formed between the metal end 850 and the quantity dot layer. The gap may be set at a distance which allows the transmission of the energy of the near-field light. Alternatively, as illustrated in FIG. 22(b), the metal end 850 may be laminated directly on the quantity dot layer. Alternatively, as illustrated in FIG. 22(c), the metal end 850 may be laminated on a dielectric substance which is laminated on the quantity dot layer.

The metal end 850 may be formed, not only on the top of the mesa structure, but also on, for example, a side surface (refer to FIG. 22(d) and (0), a bottom surface (refer to FIG. 22(e) and (h)), or in any places (refer to FIG. 22(g) and (i)).

<Fifth Embodiment>

Figure 23:
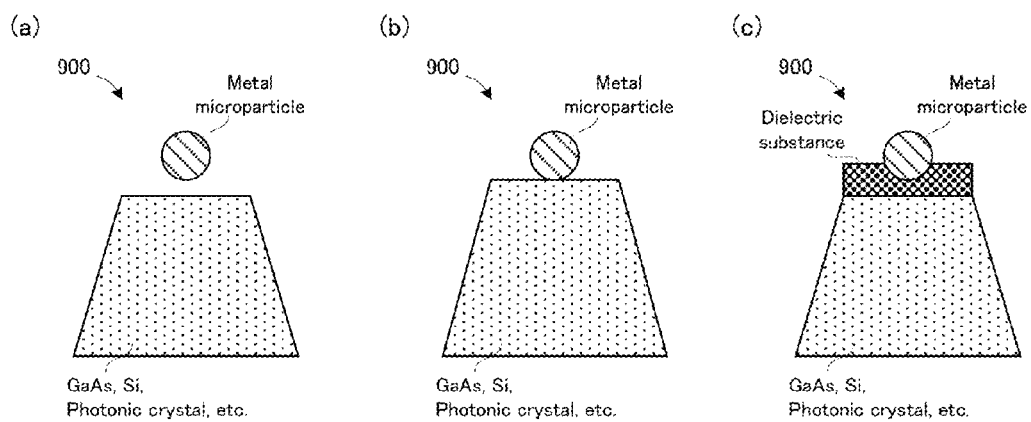
FIG. 23 are diagrams illustrating a structure of a near-field light device in a fifth embodiment of the present invention.

Next, a fifth embodiment of the near-field light device of the present invention will be explained with reference to FIG. 23. FIG. 23 are diagrams illustrating a structure of the near-field light device in the fifth embodiment of the present invention.

As illustrated in FIG. 23, a near-field light device 900 in the fifth embodiment is provided with a light receiving element such as, for example, GaAs, Si, and a photonic crystal (which is an optical crystal having a band gap (a photonic band gap) for blocking a particular wavelength, and whose known examples are Si-based photonic crystal such as silicon oxide and silicon nitride, a colloidal crystal obtained by self-alignment of polystyrene nano-particles, and the like), instead of the quantity dot layer.

As illustrated in FIG. 23(a), a gap may be formed between the metal end 850 and the light receiving element. Alternatively, as illustrated in FIG. 23(b), the metal end 850 may be laminated directly on the light receiving element. Alternatively, as illustrated in FIG. 23(c), the metal end 850 may be laminated on a dielectric substance which is laminated on the light receiving element.

<Method of Manufacturing Near-field Light Device>

Next, a method of manufacturing the near-field light device of the present invention will be explained with reference to FIG. 24 to FIG. 31.

Figure 24:
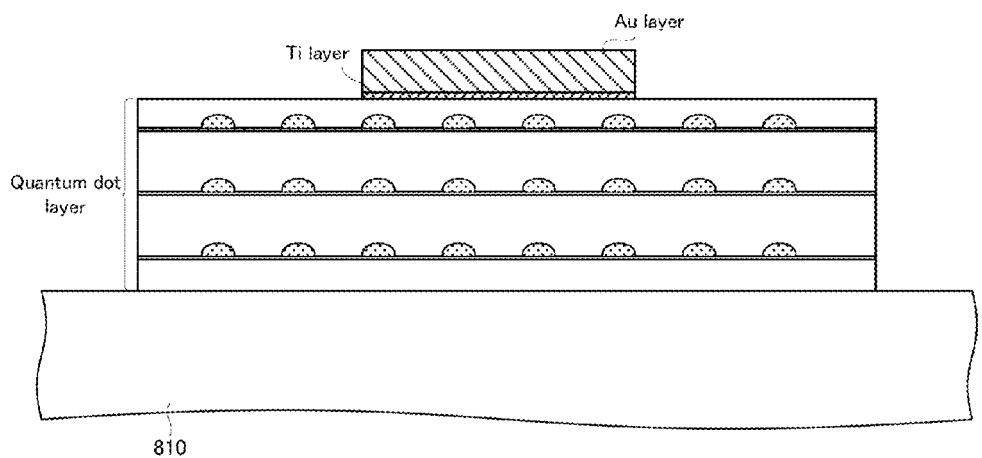
FIG. 24 is a cross sectional view illustrating one portion of a process of manufacturing the near-field light device of the present invention.
Figure 25:
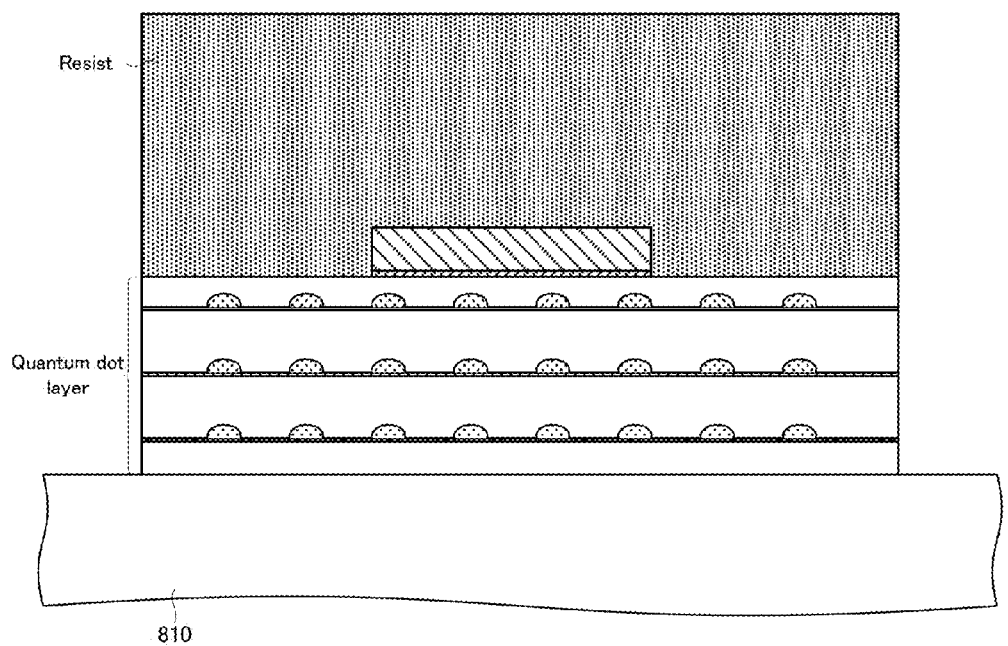
FIG. 25 is a cross sectional view illustrating a process continued from the process illustrated in FIG. 24.

As illustrated in FIG. 24, the quantity dot layer is laminated on the substrate 810, the Ti layer is laminated on the quantity dot layer, and the Au layer is laminated on the Ti layer. Then, as illustrated in FIG. 25, a resist is applied to cover the Au layer.

Figure 26:
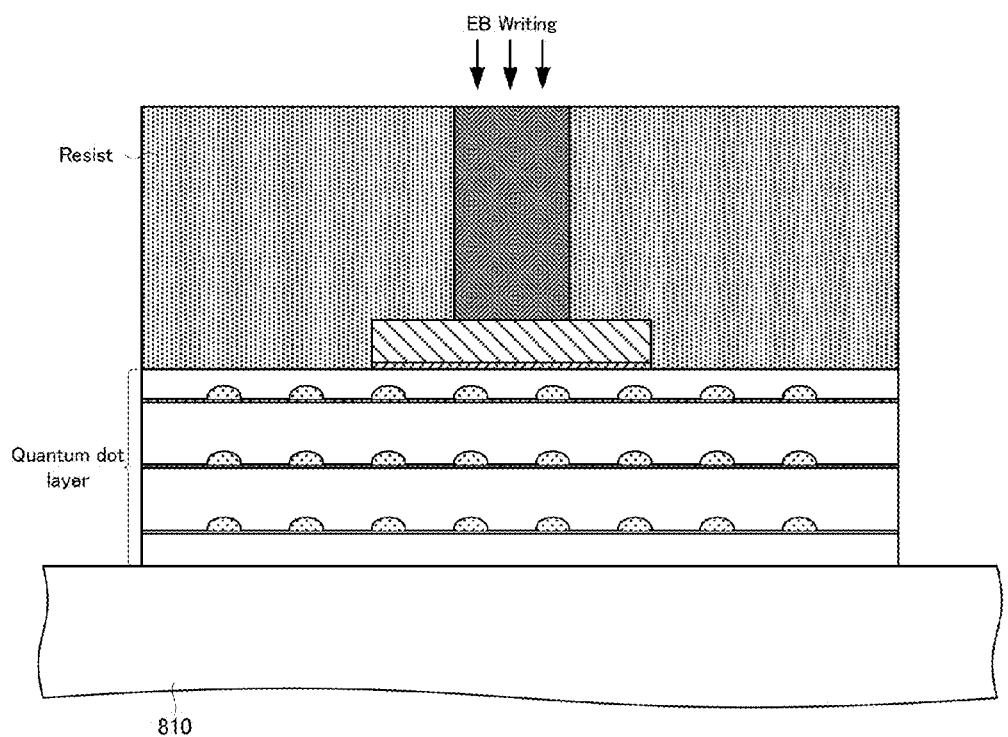
FIG. 26 is a cross sectional view illustrating a process continued from the process illustrated in FIG. 25.
Figure 27:
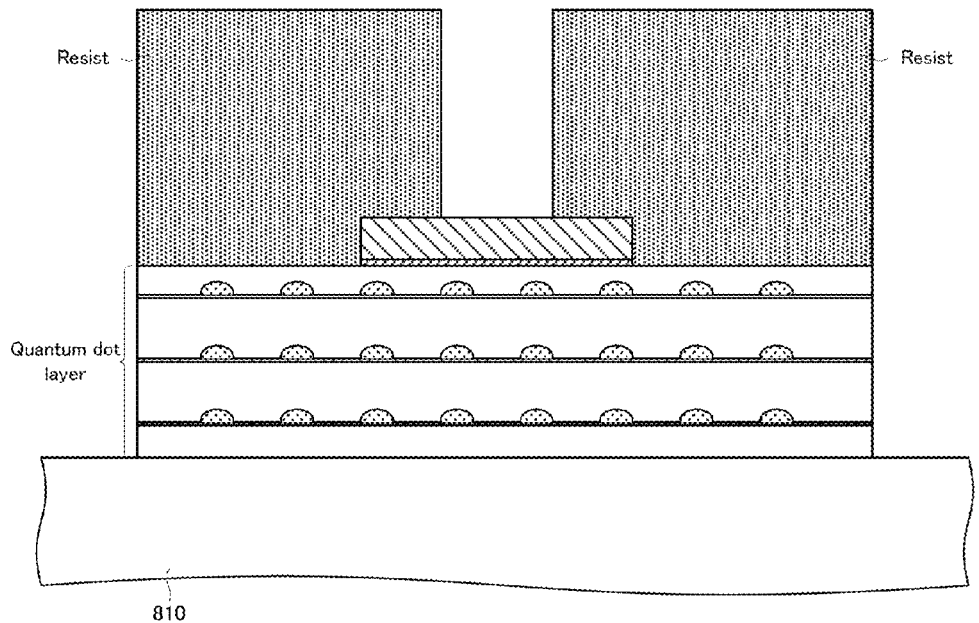
FIG. 27 is a cross sectional view illustrating a process continued from the process illustrated in FIG. 26.

Then, as illustrated in FIG. 26, the substrate 810 on which the resist is applied is irradiated with an electron beam from an electronic probe, and a predetermined fine pattern is drawn by using electron beam damage. Then, as illustrated in FIG. 27, an excess resist is removed by using, for example, a developer or the like, by which one portion of the Au layer is exposed.

Figure 28:
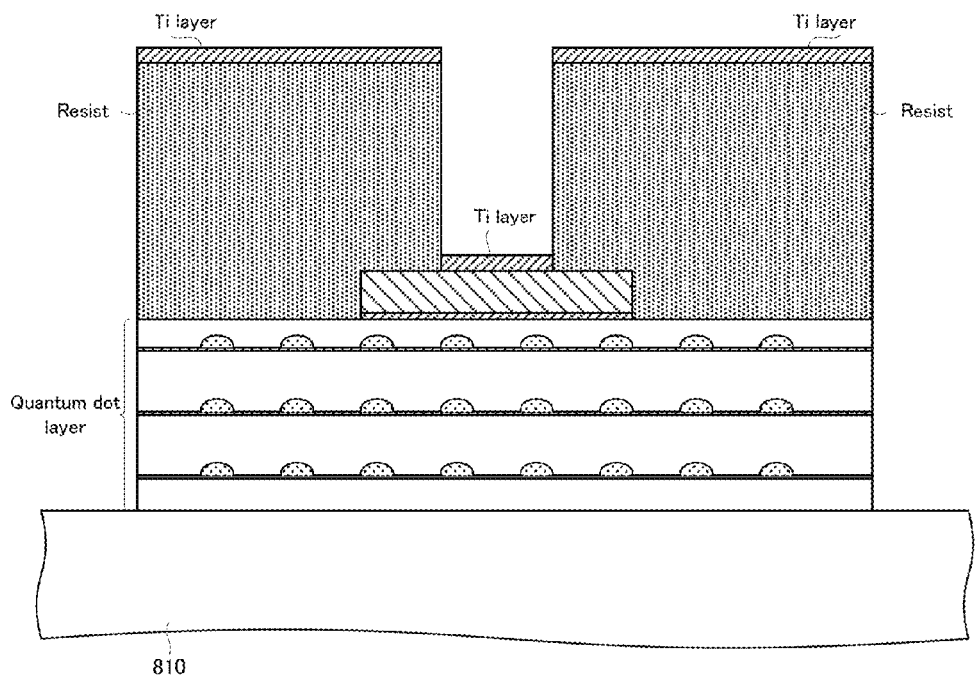
FIG. 28 is a cross sectional view illustrating a process continued from the process illustrated in FIG. 27.
Figure 29:
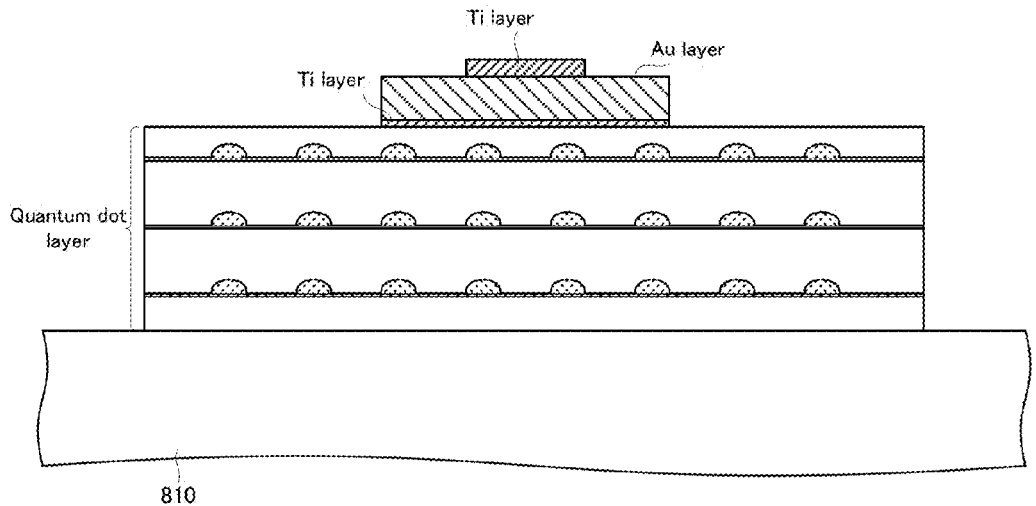
FIG. 29 is a cross sectional view illustrating a process continued from the process illustrated in FIG. 28.
Figure 30:
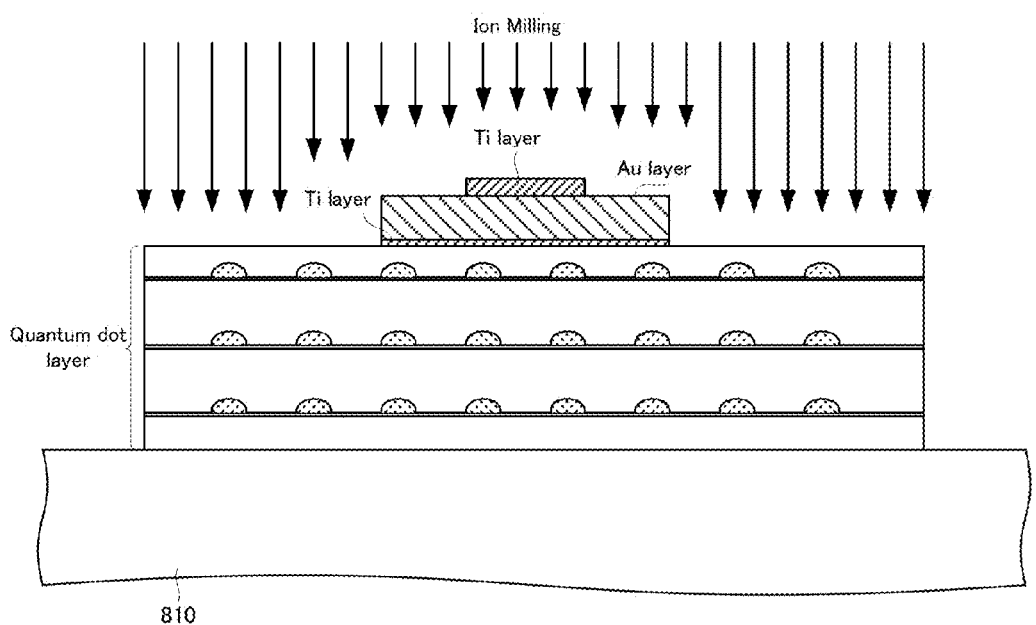
FIG. 30 is a cross sectional view illustrating a process continued from the process illustrated in FIG. 29.
Figure 31:
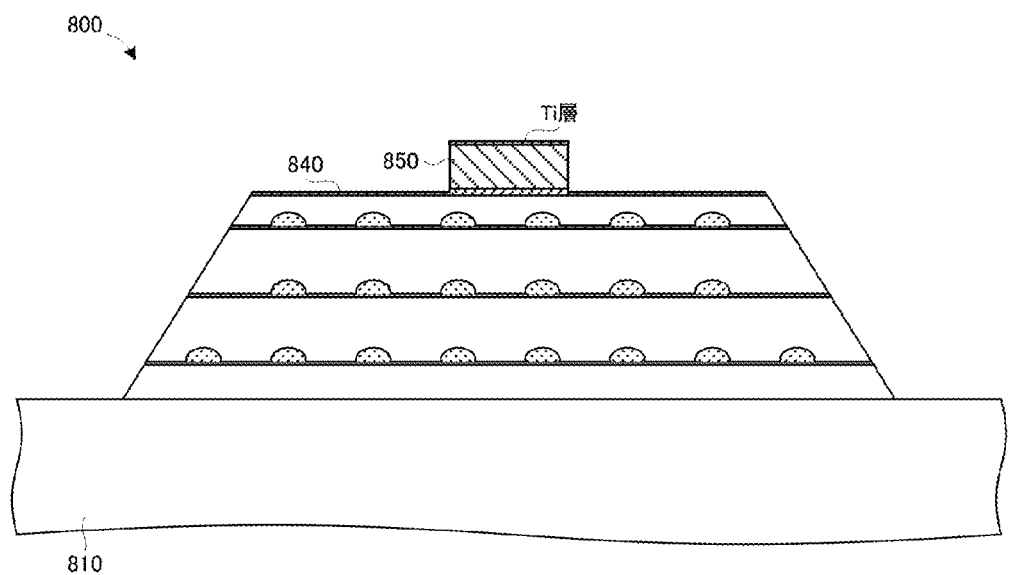
FIG. 31 is a cross sectional view illustrating a process continued from the process illustrated in FIG. 30.

Then, as illustrated in FIG. 28, a mask including, for example, of Ti or the like is formed to cover the one portion of the Au layer. Then, as illustrated in FIG. 29, the resist is removed by using, for example, a resist stripping solution or the like. Then, as illustrated in FIG. 30, the Au layer, the Ti layer and the quantum dot layer are processed in a predetermined shape by using an ion beam. As a result, the near-field light device 800 as illustrated in FIG. 31 is formed.

Incidentally, it is found from the study of the present inventors that the entire shape of the near-field light device 800 can be controlled by ion beam irradiation conditions or the like. Here, the method of manufacturing the near-field light device 800 in the fourth embodiment is listed as one example. The near-field light device in the other embodiments can be manufactured in the same procedure.

The present invention is not limited to the aforementioned embodiments, but various changes may be made, if desired, without departing from the essence or spirit of the invention which can be read from the claims and the entire specification. A near-field light device, a recording apparatus using the same, and a recording method, which involve such changes, are also intended to be within the technical scope of the present invention.

DESCRIPTION OF REFERENCE CODES 1, 53, 100, 200, 300, 400, 500, 700. 800, 900 near-field light device
11, 101, 204, 303, 402, 503 light source
15 quantum dot
17, 110, 205, 730, 850 metal end
105a, 105b first quantum dot
108 second quantum dot
201, 301, 501 first quantum dot group
202, 302, 502 second quantum dot group
203 third quantum dot group
304, 403, 504 metal nano-particle
401 quantum dot group

The invention claimed is:

1. A near-field light device, comprising:
a quantum dot structure; and
a single metal-tip on the quantum dot structure,
wherein the quantum dot structure is configured such that energy of incident light, which is light that enters the quantum dot structure and which is converted to near-field light by quantum dots in the quantum dot structure, concentrates on the single metal-tip.

2. The near-field light device according to claim 1, wherein a distance between the quantum dot structure and the single metal-tip is designed such that energy of near-field light can be propagated.

3. The near-field light device according to claim 2, wherein a dielectric substance is located between the quantum dot structure and the single metal-tip.

4. The near-field light device according to claim 1, wherein the quantum dot structure is a structure where a plurality of InAs quantum dots are dispersed in a GaAs medium.

5. The near-field light device according to claim 1, wherein,
the quantum dot structure has a first quantum dot layer including one or more quantum dots and a second quantum dot layer including one or more quantum dots, and
the first quantum dot layer and the second quantum dot layer are configured in such a way as to satisfy a distance where quantum dots can be coupled by near-field light interaction.

6. The near-field light device according to claim 1, wherein the single metal-tip is a metallic nano-particle.

7. The near-field light device: according to claim 2, wherein when a distance between the single metal-tip and a recording medium, which is placed opposite the near-field light device, is a distance which causes a near-field interaction, and the concentrated energy transfer is from the single metal-tip to the recording medium.

8. The near-field light device according to claim 2, wherein the single metal-tip is a single metal nano-particle.

9. The near-field light device according to claim 1, wherein the single metal-tip is a single gold nano-particle.

10. The near-field light device according to claim 1, wherein the single metal-tip is a single non-alloy metal.

11. The near-field light device according to claim 1, wherein the single metal-tip is non-alloy gold.

12. The near-field light device according to claim 1, wherein the single metal-tip is a non-alloy gold nano-particle.

13. A near-field light device, comprising:
a light source,
a quantum dot structure, and
a single metal-tip on the quantum dot structure,
wherein the quantum dot structure is configured such that energy of incident light, which is light that enters the quantum dot structure from the light source and which is converted to near-field light by quantum dots in the quantum dot structure, concentrates on the single metal-tip.

14. The near-field light device according to claim 13, wherein when a distance between the single metal-tip and a recording medium, which is placed opposite the near-field light device, is a distance which causes a near-field interaction, and the concentrated energy transfer is from the single metal-tip to the recording medium.

15. The near-field light device according to claim 13, wherein the single metal-tip is a single metal nano-particle.

16. The near-field light device according to claim 13, wherein the single metal-tip is a single gold nano-particle.

17. The near-field light device according to claim 13, wherein the single metal-tip is a single non-alloy metal.

18. The near-field light device according to claim 13, wherein the single metal-tip is non-alloy gold.

19. The near-field light device according to claim 13, wherein the single metal-tip is a non-alloy gold nano-particle.

* * * * *